(12) United States Patent
Umetsu et al.

(10) Patent No.: US 6,801,718 B2
(45) Date of Patent: Oct. 5, 2004

(54) CAMERA HAVING LCD PANEL DISPLAYING GROUPS OF CAMERA MODES

(75) Inventors: Takao Umetsu, Saitama (JP); Haruo Onozuka, Saitama (JP); Minoru Ishiguro, Saitama (JP); Yasuhiro Nishitani, Minato-ku (JP); Kunihiko Tanaka, Minato-ku (JP); Makoto Akiba, Saitama (JP)

(73) Assignees: Fuji Photo Optical Co., Ltd., Saitama (JP); Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/151,308

(22) Filed: May 21, 2002

(65) Prior Publication Data

US 2002/0176709 A1 Nov. 28, 2002

(30) Foreign Application Priority Data

May 23, 2001 (JP) ........................................ 2001-154625
May 23, 2001 (JP) ........................................ 2001-154626
May 23, 2001 (JP) ........................................ 2001-154627

(51) Int. Cl.$^7$ ............................ G03B 7/00; G03B 17/00
(52) U.S. Cl. ........................ 396/287; 396/239; 396/264; 396/297
(58) Field of Search ................................ 396/238, 239, 396/264, 281, 286, 287, 291, 297, 299; 348/333.01, 333.02

(56) References Cited

U.S. PATENT DOCUMENTS 5,298,936 A * 3/1994 Akitake et al. ............... 396/85
5,430,518 A * 7/1995 Tabata et al. ............... 396/452
5,589,907 A * 12/1996 Hozumi et al. ............. 396/287
5,903,786 A * 5/1999 Goto ........................... 396/297

FOREIGN PATENT DOCUMENTS

JP  9-96862    4/1997
JP  10-142651  5/1998

* cited by examiner

Primary Examiner—Russell Adams
Assistant Examiner—Arthur A Smith
(74) Attorney, Agent, or Firm—Sughrue Mion, PLLC

(57) ABSTRACT

Modes of a camera are classified into groups according to their type. On an LCD panel, the different groups are displayed on different rows, and modes to be selected out of each group are displayed in different columns. Group selection is accomplished by vertically manipulating a selector button, and mode selection out of each group is accomplished by laterally manipulating the selector button. This makes possible displaying of selectable modes classified by group on the LCD panel in a way perceivable at a glance. Furthermore, the choice of a group and that of a mode within each group are matched in the mode display arrangement to facilitate the operation for mode selection.

8 Claims, 29 Drawing Sheets

FIG.8

| SELECTION MODES | MODES |
|---|---|
| FLASH SELECTION MODE | AUTO, PRE, ON, F_OFF, NVP |
| SELF SELECTION MODE | S_OFF, SELF1, SELF2, SELF3, REMOCON |
| FOCUS SELECTION MODE | AF, INF, MACRO |
| DATE SELECTION MODE | D_OFF, YEAR-MONTH-DAY, MONTH-DAY-YEAR, DAY-MONTH-YEAR, DAY-HOUR-MINUTE |

*FLASH SELECTION MODE
AUTO, ON, F_OFF AND
NVP LCD SEGMENTS ARE ON

PER IS INTERMITTENTLY LIT
IN 2Hz PERIODS

LED1 OFF
LED2 ON

↓ (/SMENU ON)

*FLASH SELECTION MODE
 AUTO, PER, ON AND
 F_OFF LCD SEGMENTS ARE ON

NVP SEGMENT IS INTERMITTENTLY LIT
IN 2 Hz PERIODS

LED1 OFF
LED2 [ON]

↓ (/SMENU ON FOR 2 SECONDS)

*NVP LATCH MODE

NVP LCD SEGMENT IS INTERMITTENTLY LIT
IN 2 Hz PERIODS

LED1 [ON]
LED2 OFF

FIG.14(A)
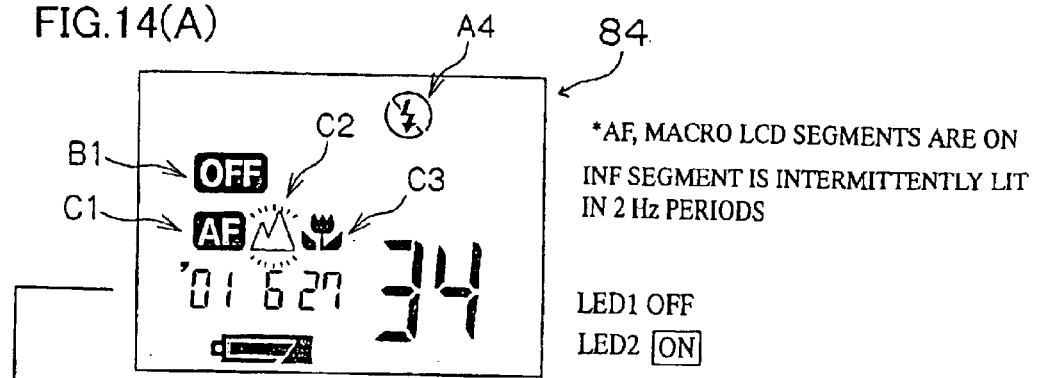
*AF, MACRO LCD SEGMENTS ARE ON
INF SEGMENT IS INTERMITTENTLY LIT
IN 2 Hz PERIODS
LED1 OFF
LED2 [ON]
FIG.14(B)    (/SMENU ON FOR LESS THAN 2 SECONDS)
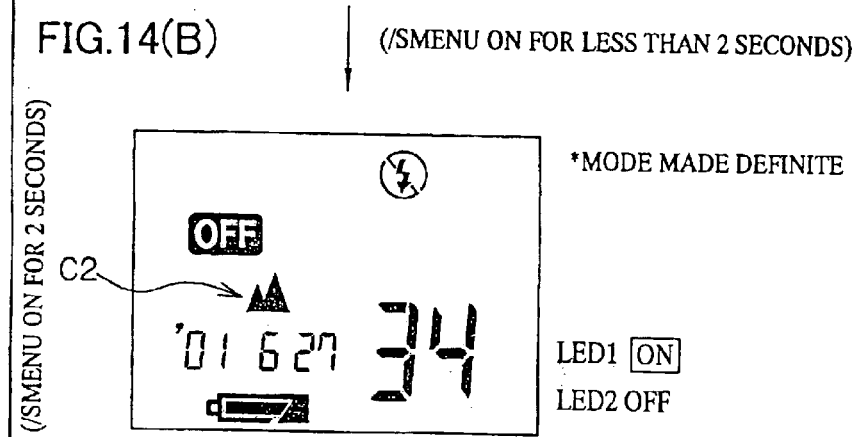
*MODE MADE DEFINITE
LED1 [ON]
LED2 OFF
(/SMENU ON FOR 2 SECONDS)
FIG.14(C)
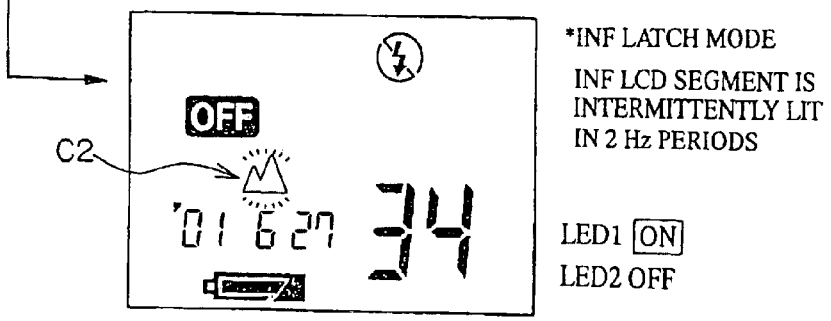
*INF LATCH MODE
INF LCD SEGMENT IS
INTERMITTENTLY LIT
IN 2 Hz PERIODS
LED1 [ON]
LED2 OFF

*DETE LCD SEGMENT IS INTERMITTENTLY LIT IN 2 Hz PERIODS

LED1 OFF
LED2 [ON]

(/SMENU ON FOR LESS THAN 2 SECONDS)

LED1 [ON]
LED2 OFF (/SMENU ON FOR 2 SECONDS)

* "DAY" LCD SEGMENT OF DATE IS INTERMITTENTLY LIT IN 2 Hz PERIODS

LED1 OFF
LED2 [ON]

FIG.16(A)
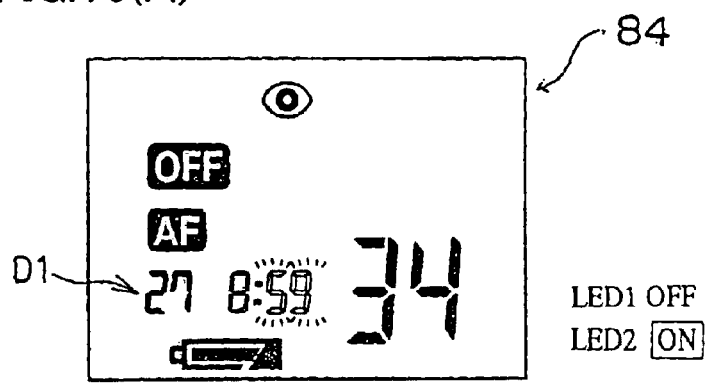
LED1 OFF
LED2 [ON]
FIG.16(B)   (/SMENU ON)
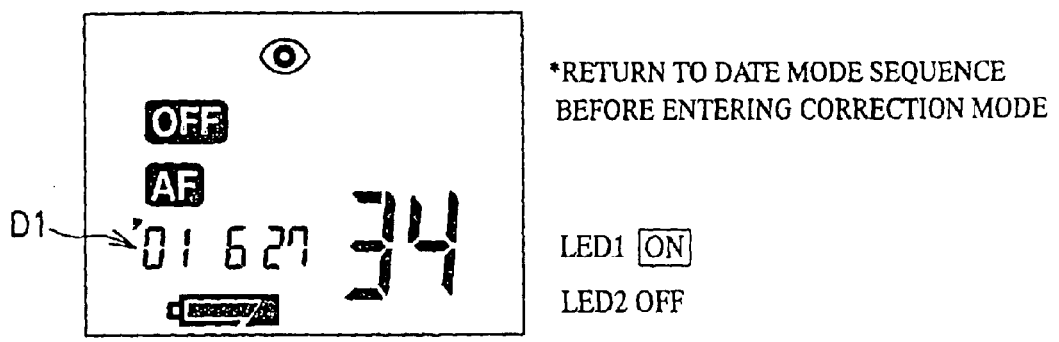
*RETURN TO DATE MODE SEQUENCE
BEFORE ENTERING CORRECTION MODE
LED1 [ON]
LED2 OFF

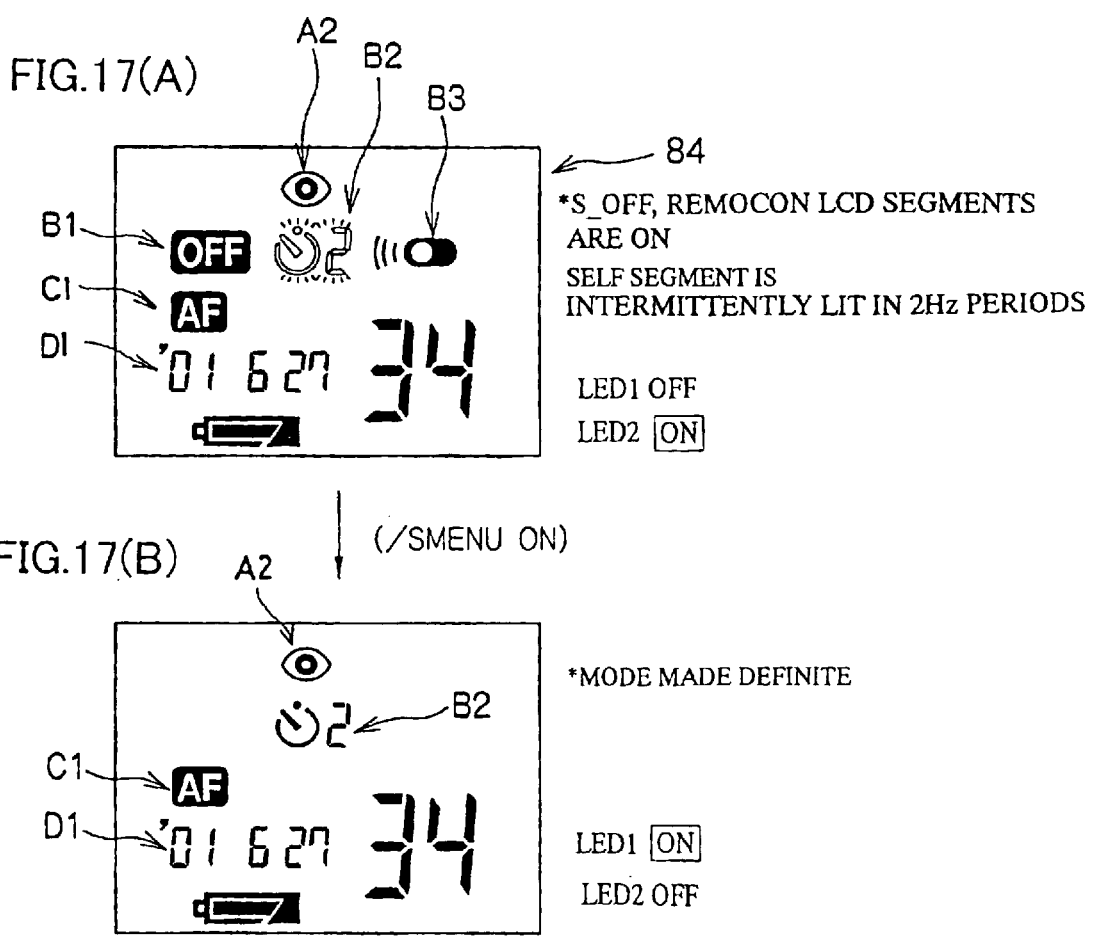

EXAMPLE OF UP, DOWN FOR "DAY" COLUMN (/SUP ON) ↑ ↓ (/SDOWN ON)

(/SUP ON) ↑ ↓ (/SDOWN ON)

EXAMPLE OF UP, DOWN FOR "MINUTES" COLUMN (/SUP ON) ↑ ↓ (/SDOWN ON)

(/SUP ON) ↑ ↓ (/SDOWN ON)

*FOCUS SELECTION MODE

LED1 OFF
LED2 [ON]

(/SDOWN ON)

* DATE CORRECTION MODE

INITIAL VALUE IS
01  6  15 (JUNE 15, '01)

LED1 OFF
LED2 [ON]

(/SUP ON)

LED1 OFF
LED2 [ON]

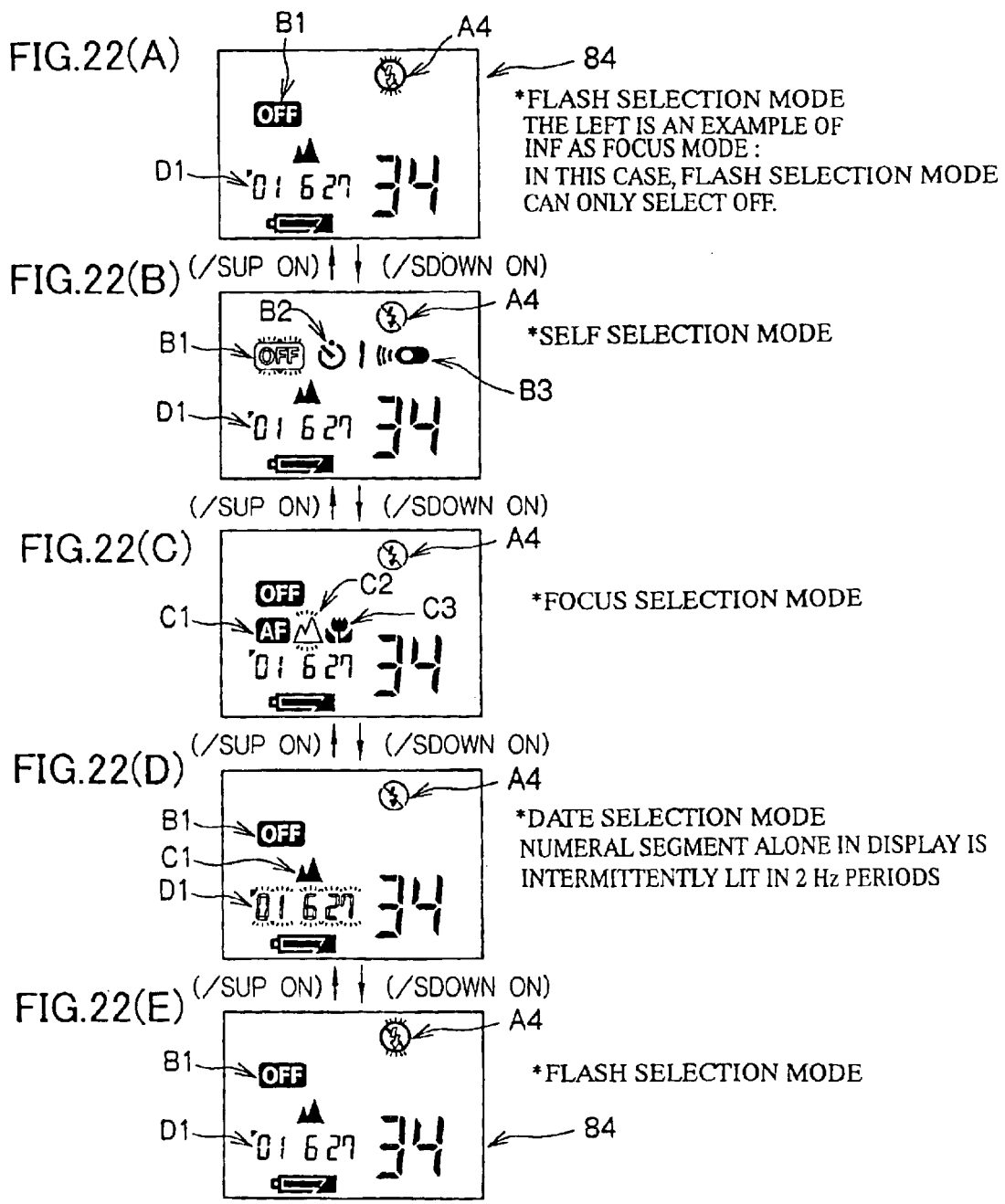

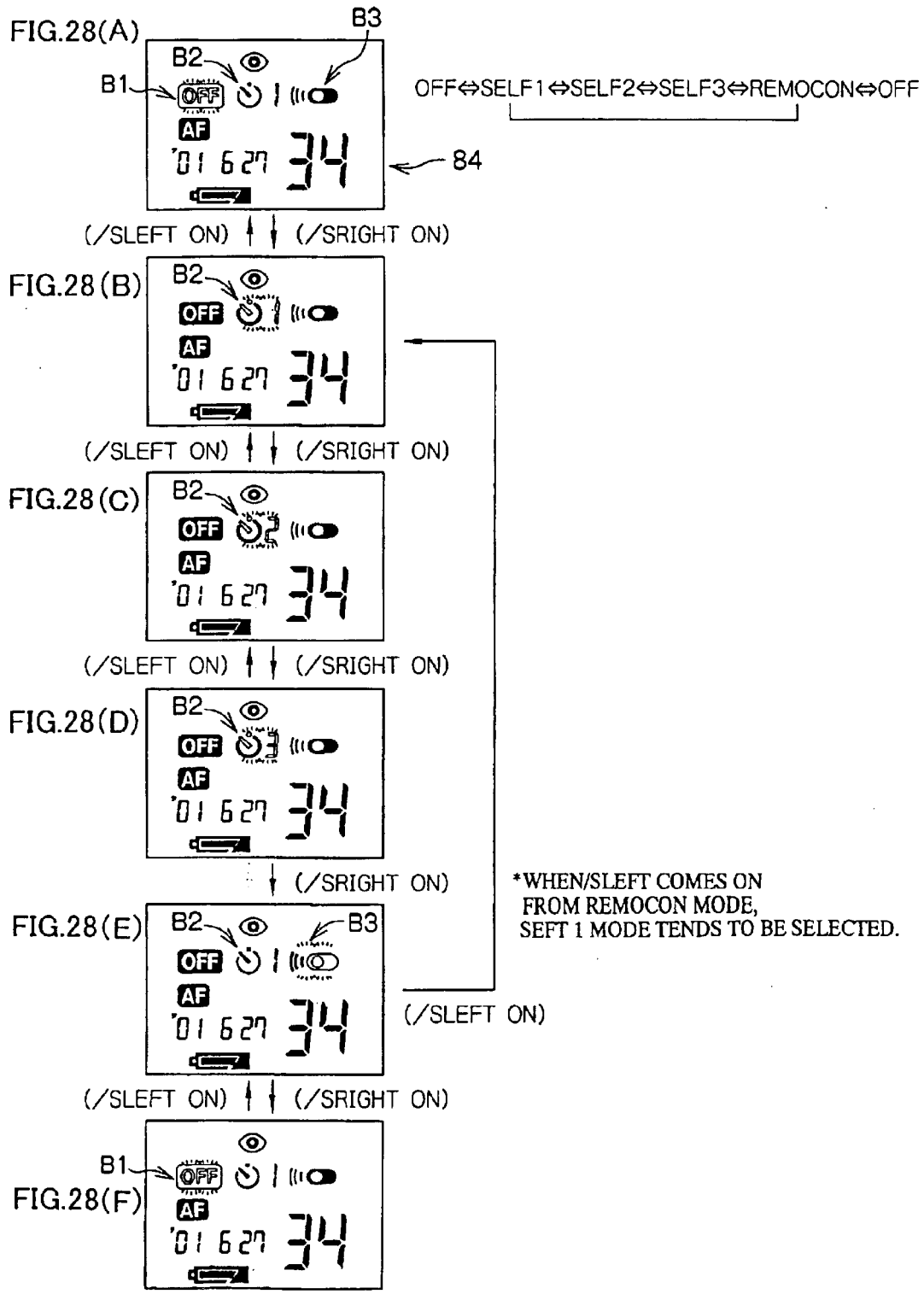

*WHEN INF IS SELECTED
FLASH MODE CHANGED OVER
TO PRE→F_OFF (PREVIOUS STATE MEMORIZED
UNTIL FINALIZED)

*WHEN AF→INF→MACRO IS SELECTED
FLASH MODE CHANGED OVER TO AUTO

*WHEN INF→AF, MACRO→AF
IS SELECTED

FLASH MODE IS RETURNED
TO INITIAL MODE
BEFORE SELECTION OF INF,MACRO

*DATE MODE CHANGE-OVER
SHALL BE IN FOLLOWING SEQUENCE
YEAR, MONTH, DAY⇔MONTH, DAY, YEAR
⇔DAY, MONTH, YEAR⇔
DAY, HOURS, MINUTES ⇔OFF⇔
YEAR, MONTH, DAY (/SLEFT ON) ↕ (/SRIGHT ON)

(/SLEFT ON) ↕ (/SRIGHT ON)

(/SLEFT ON) ↕ (/SRIGHT ON)

(/SLEFT ON) ↕ (/SRIGHT ON)

(/SLEFT ON) ↕ (/SRIGHT ON)

CAMERA HAVING LCD PANEL DISPLAYING GROUPS OF CAMERA MODES

BACKGROUND OF THE INVENTION

1. Field of the Invention

The present invention relates to a camera, and more particularly to a camera having a display device, such as a liquid crystal display panel, for displaying modes of the camera.

2. Description of the Related Art

In a conventional camera, a mode selector switch is allocated for each group of modes. In selecting a desired mode of the camera, every time a mode selector switch is pressed, the selected mode changes cyclically among the modes of the group which the switch serves, and an icon, characters or the like displaying the currently selected mode are displayed on a display unit.

For instance, every time a mode selector switch allocated to a group of flash lamp-related modes is pressed, the selected mode is cyclically switched to a low luminance automatic lighting mode, a red eye preventing mode, an all-time flash lamp lighting mode, a flash lamp forbidding mode, a night view portrait mode and back to the low luminance automatic lighting mode (see Japanese Patent Application Publication No. 10-142651). On the other hand, every time a mode selector switch allocated to a group of focusing-related modes is pressed, the selected mode is cyclically switched to an auto-focusing mode, a fixed infinite-distance focusing mode, a macro-focusing mode and so forth.

There also is a camera in which if, for instance, the fixed infinite-distance focusing mode is selected, any mode which would allow the flash lamp to be light is restricted in the group of flash lamp-related modes (see Japanese Patent Application Publication No. 10-142651).

Further, there is a camera according to the prior art which permits changing over among multiple self-photographing modes allowing choice of the number of self-taken pictures (for instance, a SELF 1 mode S1 for automatically taking one picture, a SELF 2 mode S2 for automatically taking two pictures, and a SELF 3 mode S3 for automatically taking three pictures), a remote control mode Rem, and an Off mode OFF for canceling the multiple self-photographing modes and the remote control mode. When changing over a camera having these modes from one mode to another, the applicable one of the mode selector switches allocated to groups to which these modes respectively belong is pressed. Every time the mode selector switch is pressed, the selected mode changes cyclically in one direction in a sequence of OFF→S1→S2→S3→Rem→OFF and so on (see Japanese Patent Application Publication Nos. 9-96862 and 10-142651).

As described above, any conventional camera displays on its display unit only the mode selected with a mode selector switch, the screen size of the display unit can be kept small, but all selectable modes cannot be displayed. Therefore, it is impossible to check at a glance what modes are available with the camera and, moreover, what mode has been set needs to be checked on the display screen every time the mode selector switch is pressed, resulting in inconvenience in mode selection. There further is the problem that, where a large number of groups are involved, the number of switches allocated for the groups also increases.

Another conventional camera permitting limitation of the combinations of modes has a simplified displaying function, making it sometimes impossible to know in what mode a picture is being taken. If, for instance, the fixed infinite-distance focusing mode is selected, the signs of modes that permit lighting of the flash lamp are no longer displayed or, as modes related to the flash lamp and modes related to focusing are combined, no individual mode is displayed, again making it sometimes impossible to know in what mode a picture is being taken.

Moreover, as the above-described changing over to the multiple self-photographing mode, the remote control mode Rem and the Off mode OFF cyclically takes place in a single direction, there is the problem that if for instance the SELF 1 mode S1 is desired but the mode selector switch is pressed more than once by mistake and the SELF 2 mode S2 is selected, in order to select the SELF 1 mode S1 anew, the mode selector switch will have to be pressed four times in the sequence of S3→Rem→OFF→S1.

It is conceivable to provide a switch permitting mode changes in the reverse sequence to the aforementioned (in other words, a switch capable of changing over in the counter-forward direction).

In this case, as the remote control mode Rem, for instance, is selected at the moment, if the mode change is accomplished in the reverse direction to select a self mode, the SELF 3 mode S3, which is the least frequently used, will be selected first.

SUMMARY OF THE INVENTION

An object of the present invention, attempted in view of these circumstances, is to provide a camera which permits recognition at a glance the selectable modes in each group and easy understanding of the way of mode selection because the selection of a group and that of a mode in each group match the arrangement of displayed mode signs. Another object is to provide a camera which can clearly indicate in what combination of modes a picture is to be taken, any limitation that may be applied to mode selection and any automatic change in the mode selected in another group. A still another object is to provide a camera which permits changing over in both directions, forward and backward, where choice is to be made out of a multiple self-photographing mode, a remote control mode and an Off mode, and more convenient changing over by differentiating selectable modes between the forward and backward directions.

In order to achieve the above-described objects, the present invention is directed to a camera, comprising: a display device which displays a plurality of modes of the camera, the display device classifying the plurality of modes into groups according to their type and simultaneously displaying the mode selected in each group in a different row or column for each group; and an operating member which selects a desired one out of the groups and selects a desired one out of the modes belonging to the selected group.

According to the present invention, the modes belonging to the groups are displayed on the display device on rows or columns differentiated by the group. The operating member enables the camera to be promptly set in the desired mode by selecting a desired one out of the groups and a desired mode out of the modes belonging to the selected group.

Preferably, the display device displays all selectable modes belonging to the group selected by the operating member, and displays only the mode selected for each group out of the modes belonging to the other groups not selected by the operating member.

Preferably, the display device distinguishably displays a selected mode and other modes out of selectable modes belonging to the group selected by the operating member.

Preferably, the display device intermittently displays one and continuously displays the others of the selected mode and other modes out of selectable modes belonging to a group selected by the operating member.

Preferably, the operating member comprises a cross-shaped button manipulable vertically and laterally; one group is selected out of groups arranged vertically or one mode is selected out of a plurality of grouped modes arranged vertically by vertical manipulation of the cross-shaped button; and one mode is selected out of a plurality of grouped modes arranged laterally or one group is selected out of groups arranged laterally by lateral manipulation of the cross-shaped button. According to the present invention, the manipulation of the cross-shaped button, selection of one group out of groups and selection of one mode out of each group match one another to make the handling easy to understand.

Preferably, the plurality of modes are classified into at least two or more groups out of a group of modes related to a flash lamp, a group of modes related to the start of shutter releasing, a group of modes related to focusing, and a group of modes related to date printing.

The present invention is also directed to a camera, comprising: a display device which displays a plurality of modes of the camera, the display device classifying the plurality of modes into groups according to their type and simultaneously displaying the mode selected in each group; an operating member which selects a desired one out of the groups and selects a desired one out of the modes belonging to the selected group; and a limiting device which, in the selection of a mode belonging to a certain group by the operating member, limits selectable modes according to modes selected out of other groups or, if the operating member selects a mode belonging to a certain group, automatically changes, according to that selected mode, modes selected out of other groups.

According to the present invention, as the display device simultaneously displays modes selected out of different groups, it can easily distinguish, when a mode belonging to a certain group is to be selected and if modes selected out of other groups are automatically changed, those changed modes.

Preferably, the display device displays all selectable modes belonging to the group selected by the operating member and, for the modes belonging to other groups not selected by the operating member displays only a selected or automatically changed mode in each group. According to the present invention, in selecting a mode belonging to a certain group, as all selectable modes belonging to the group are displayed, it is possible to easily identify the state of limitation by selection from other groups, and at the same time the state of mode selection or automatic mode change in other groups.

Preferably, the limiting device, when the operating member selects a mode belonging to a certain group, automatically changes, according to the selected mode, modes selected out of other groups and, if the operating member subsequently further selects the mode belonging to the certain group, returns automatically changed modes in other groups to their initially selected modes. According to the present invention, the trouble of selection a mode out of each group anew is saved.

Preferably, the groups comprise a first group of modes related to a flash lamp and a second group of modes related to focusing; and the limiting device, in selecting a mode belonging to the first group, limits the selectable modes according to the mode selected out of the second group and, when the operating member selects a mode belonging to the second group, automatically changes, according to that selected mode, the mode selected out of the first group.

Preferably, the first group has at least two or more modes out of a low luminance automatic lighting mode, a red eye preventing mode, an all-time flash lamp lighting mode, a flash lamp forbidding mode, and a night view portrait mode, the second group has at least two or more modes out of an auto-focusing mode, a fixed infinite-distance focusing mode, and a macro-focusing mode.

The present invention is also directed to a camera capable of changing over among multiple self-photographing modes in which the number of self-shot pictures is selectable, a remote control mode, and an OFF mode for canceling the multiple self-photographing modes and the remote control mode, the camera comprising: an operating member which changes over the OFF mode, the multiple self-photographing modes and the remote control mode in a forward or backward direction; and a mode changing device which changes the selectable modes according to the direction in which the operating member is manipulated, forward or backward.

According to the present invention, it is made possible to change over from one mode to another in either the forward or reverse direction, so that the camera can be promptly set in a desired mode, and to change the selectable modes depending on the direction of changing over, forward or backward, so that mode selection can be accomplished in a more natural manner.

Preferably, the multiple self-photographing modes comprises 1 to n self modes where n is the selectable number of self-taken pictures; and when the operating member is manipulated within the range of the 1 to n self modes in either the forward or backward direction, the mode changing device selects the 1 to n self modes sequentially in either the forward or backward direction and, if the operating member is manipulated in any other mode than the 1 to n self modes in the backward direction, the mode changing device selects only the self 1 mode.

According to the present invention, within the range of 1 to n self modes, the 1 to n self modes can be selected in either the forward or backward direction and, when a change-over another mode to a self mode is to take place, a change-over to the self 1 mode is accomplished at the outset.

Preferably, the camera further comprises: a display device which automatically displays the OFF mode, one self mode out of the 1 to n self modes and the remote control mode, wherein when the operating member is manipulated in the forward direction for a change-over to any other mode than the 1 to n self modes, the display device returns the display from the self n mode to the self 1 mode.

Preferably, the display device distinguishably displays a mode selected by the operating member and another mode not selected thereby, out of the OFF mode, one self mode out of the 1 to n self modes and the remote control mode.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 8 is a table for use in explaining selection modes;

FIGS. 12(A) and 12(B) show how the display screen of the LCD panel looks when it is in no selection mode and the switch /SMENU is turned on;

FIGS. 13(A), 13(B) and 13(C) show how the display screen of the LCD panel looks when it is in no selection mode, the FLASH mode is to be latched and the switch /SMENU is turned on;

FIGS. 14(A), 14(B) and 14(C) show how the display screen of an LCD panel 84 looks when it is in a selection mode, the currently selected mode is to be latched and the switch /SMENU is turned on;

FIGS. 16(A) and 16(B) show how the display screen of the LCD panel looks when the switch /SMENU is turned on in a DATE correction mode;

FIGS. 17(A) and 17(B) show how the display screen of the LCD panel looks in mode finalization processing;

FIGS. 22(A), 22(B), 22(C), 22(D) and 22(E) show how the display screen of the LCD panel looks in selection mode change-over processing;

FIGS. 28(A), 28(B), 28(C), 28(D), 28(E) and 28(F) show how the display screen of the LCD panel looks in SELF selection mode selection processing;

DETAILED DESCRIPTION OF THE PREFERRED EMBODIMENTS

Cameras, which are preferred embodiments of the present invention, will be described in detail below with reference to accompanying drawings.

Figure 1:
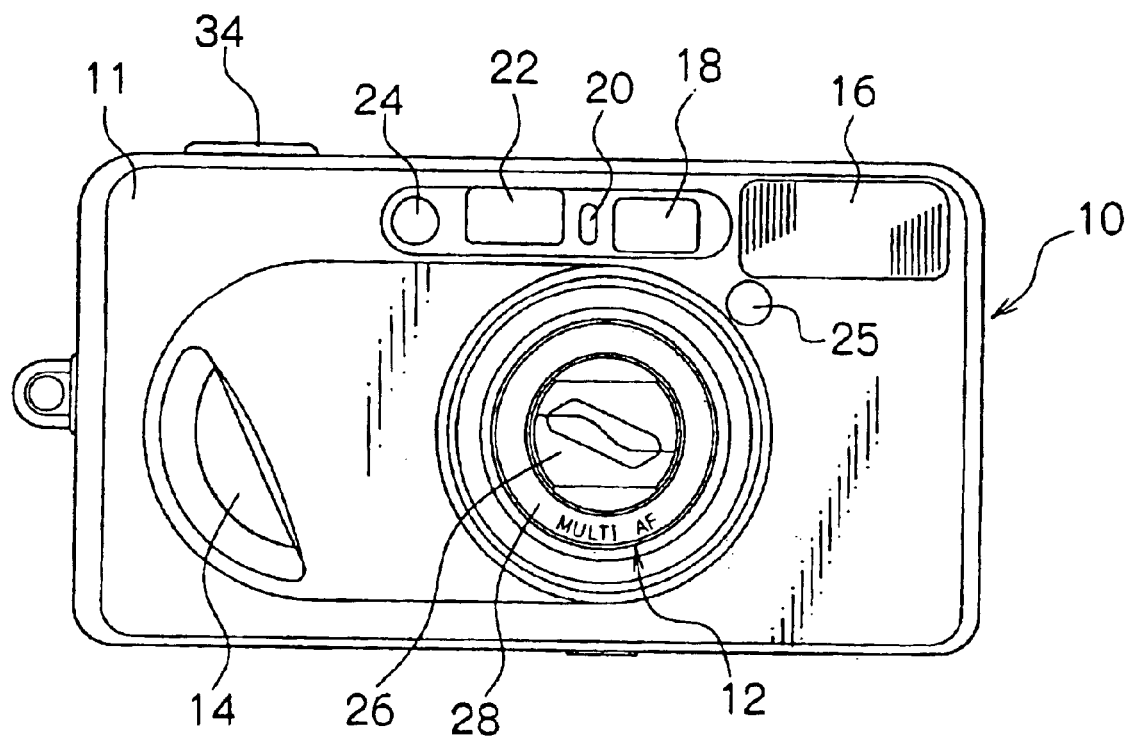
FIG. 1 shows a front external view of a camera to be loaded with a size 135 film.
Figure 2:
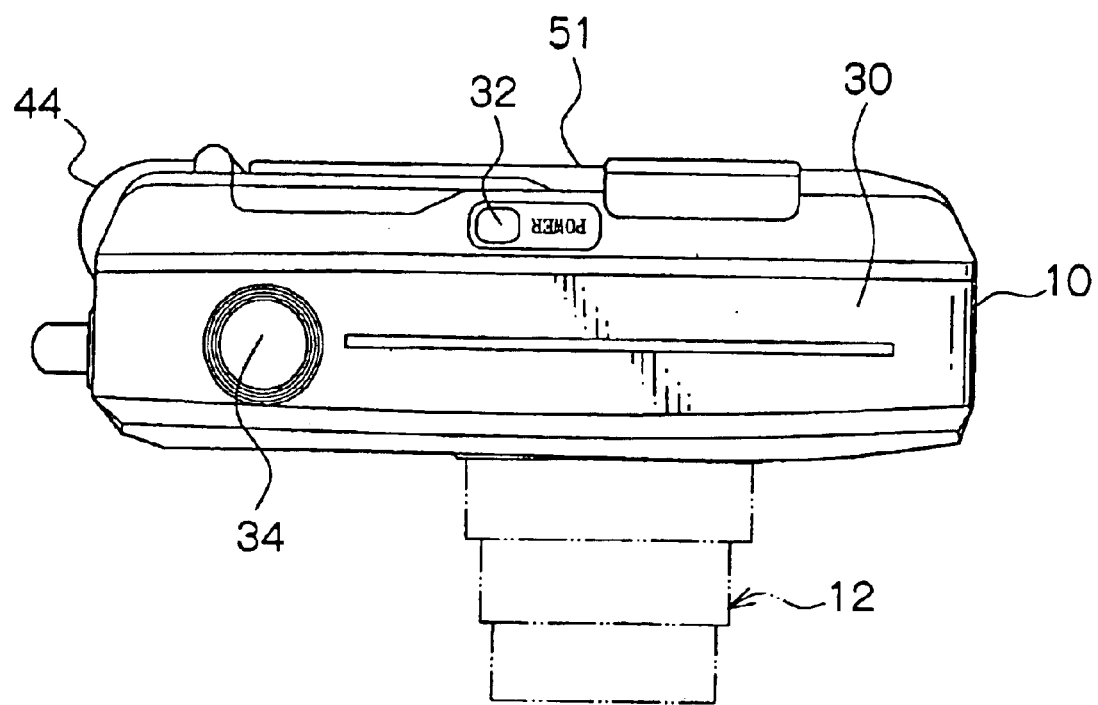
FIG. 2 shows an external planar view of a camera to be loaded with a size 135 film.
Figure 3:
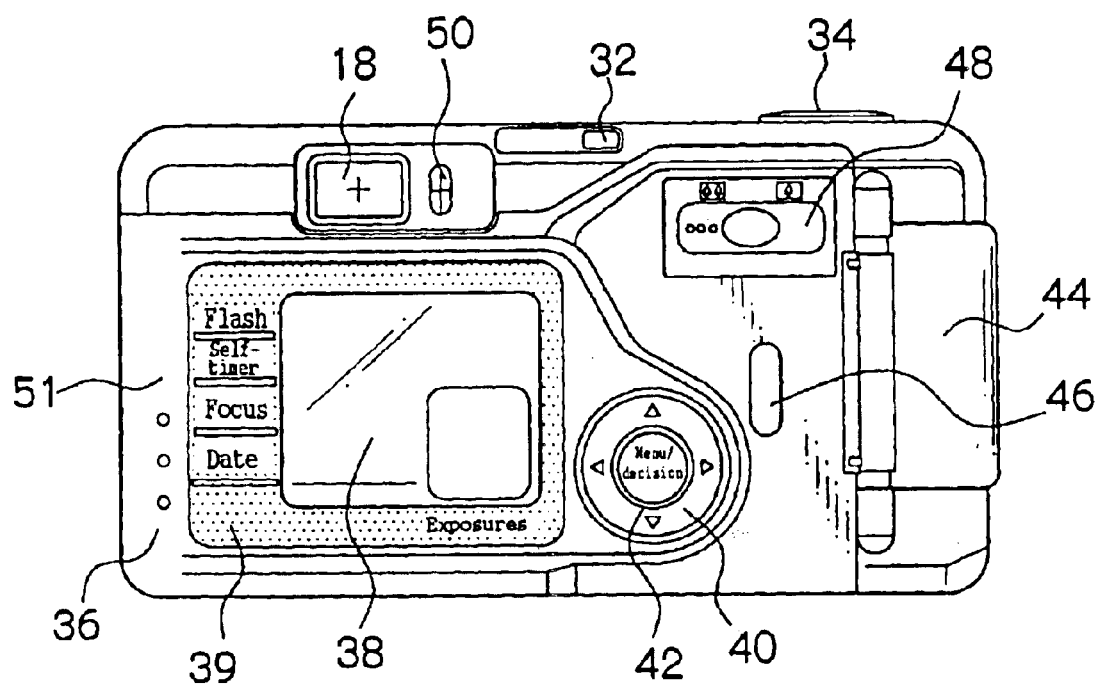
FIG. 3 shows a rear external view of a camera to be loaded with a size 135 film.
Figure 4:
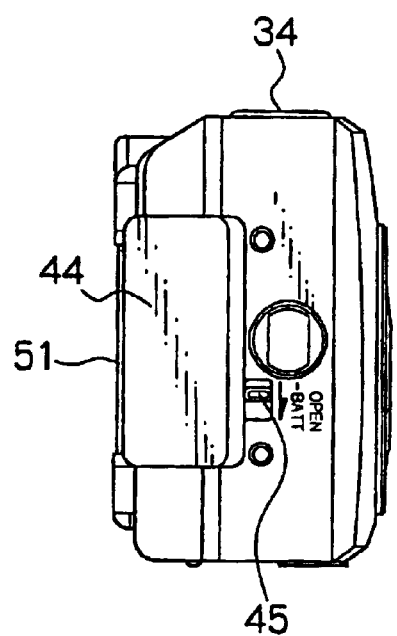
FIG. 4 shows a left side profile of a camera to be loaded with a size 135 film.

FIG. 1 to FIG. 5 show external views of a camera to be loaded with a size 135 film wherein FIG. 1 shows a front view; FIG. 2, a plan; FIG. 3, a rear view; FIG. 4, a left side profile; and FIG. 5, a right side profile.

On the front face 11 of the case 10 of the camera shown in FIG. 1, there are provided a zoom lens tube 12, a finger hold 14 comprising a substantially crescent-shaped protuberance, a flash lamp window 16, a view finder 18, a self-action indicator window 20, a passive type AF window 22, a remote control light receiving window 24 and a photometric window 25 among other elements. On the front face the zoom lens tube 12 are provided a lens barrier 26, and outside the lens barrier 26 is an annular ornamental plate 28.

On the top face 30 of the case 10 of the camera shown in FIG. 2, there is provided a main switch 32 in a rear corner and a shutter release button 34 in a flat area to the left in FIG. 2. Further on the rear face 36 of the case 10 of the camera shown in FIG. 3, there are provided an LCD display window 38, a cross key type selector button 40 and a menu/decision button 42. On the left side 39 of the LCD display window 38 are printed such characters as "flash", "self-timer", "focus", "date" and so forth. By selecting with the selector button 40 the flash or any other function and pressing the menu/decision button 42 after the selection, the selection of the function can be executed. Further on the rear face of the case 10 toward the right is provided a battery compartment lid 44, inside which is formed a battery compartment (not shown). On a side of the case 10 of the camera, there is provided, slidably in the vertical direction, a battery compartment lid opening/closing stub 45 shown in FIG. 4. By sliding downward the battery compartment lid opening/closing stub 45, the battery box lid 44 can be opened.

Figure 5:
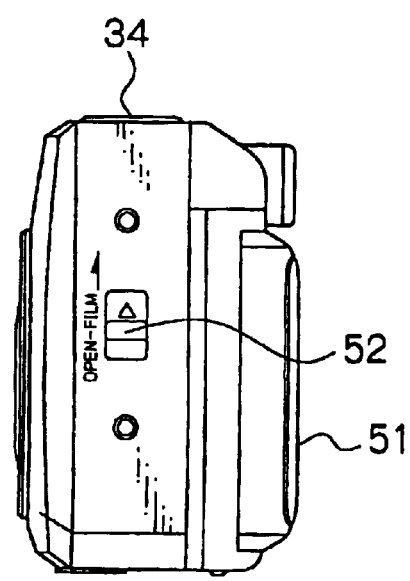
FIG. 5 shows a right side profile of a camera to be loaded with a size 135 film.

To the left of the battery compartment lid (battery compartment) 44 in FIG. 3, there is formed a film housing (not shown), and a transparent film magazine checking window 46 in a matching position, so that the sensitivity and other factors of the film can be checked from outside. At the top of the rear face of the case 10 of the camera, there are formed a seesaw type zooming button 48, an AF indicator window 50 and so forth. The AF indicator window 50 is lit in green when range finding in the state of the shutter release button 34 being manually pressed is completed, and turns on and off changeably when the range is immeasurable because the subject is too close or any other reason. As shown in FIG. 5, on the right hand side of the case 10, there is provided, slidably in the vertical direction, a rear lid opening/closing stub 52, and by sliding this rear lid opening/closing stub 52 the rear lid 51 can be opened for loading or unloading a film.

Figure 6:
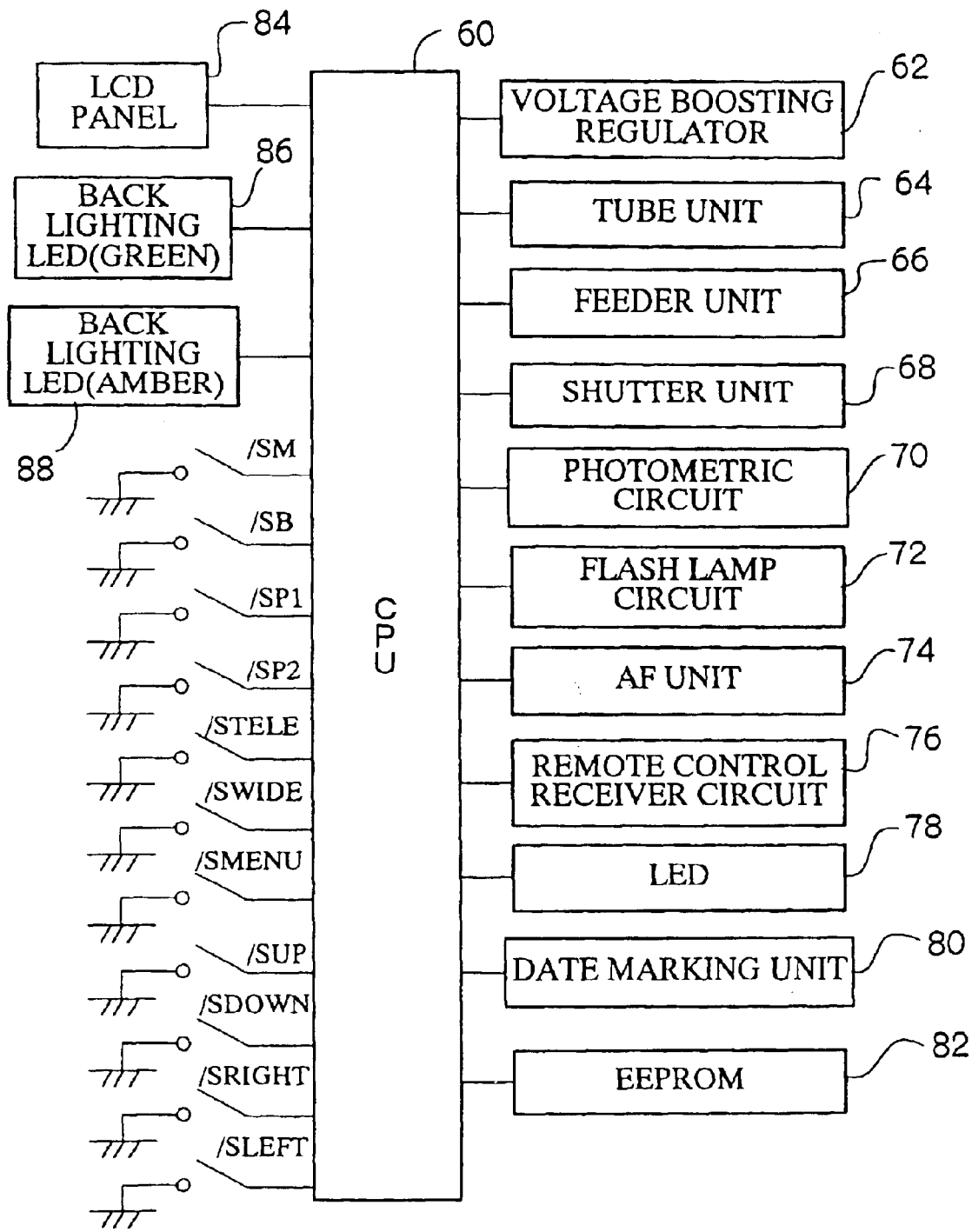
FIG. 6 is a block diagram illustrating the configuration of the control unit of a camera.

FIG. 6 is a block diagram illustrating the configuration of the control unit of the camera. As illustrated therein, the camera has a built-in CPU 60, and at instructions from this CPU 60 different parts of the camera, to be described below, are regulated for overall control of the camera.

In FIG. 6, a voltage boosting regulator 62 boosts and stabilizes the voltage of the battery, and supplies power to the CPU 60 and other circuits. A tube unit 64 controls the extended position of the zoom lens tube 12 to vary the zoom magnification and other factors. A feeder unit 66 controls the feeding and rewinding of the film. The shutter unit 68 controls the releasing and closing of the shutter at the time of shooting. A photometric circuit 70 measures the luminous energy of the subject according to the external light taken in through the photometric window 25 (see FIG. 1). A flash lamp circuit 72 controls the charging of a capacitor and the lighting of the flash lamp (flash) based on the luminance of the external light detected by the photometric circuit 70 and other factors. An AF unit 74 performs range finding by a passive system based on the external light taken in through the AF window 22 (see FIG. 1) and controls focusing. A remote control receiver circuit 76 receives a signal from a remote control device (not shown) for use when the photographer himself or herself is the subject or on other similar occasions, and gives the signal to the CPU 60. LED 78 represents an LED lit in the self-action indicator window 20 (see FIG. 1) and an LED lit in the AF indicator window 50 (see FIG. 3), and the turning on and off and intermittent lighting of these LEDs are controlled by the CPU 60. A DATE marking unit 80 controls marking of the date and hours of shooting onto each frame of the film. An electrically erasable programmable ROM (EEPROM) 82 stores various parameters and data regarding the control of the camera.

On an LCD panel 84, so arranged that displays thereon can be seen through the LCD display window 38 (see FIG. 3) on the rear face of the camera, various graphic patterns, letters and numerals are displayed. A back lighting LED 86 and a back lighting LED 88 are light sources for back lighting of the LCD panel 84. The back lighting LED 86 illuminates the LCD panel 84 in green, and the back lighting LED 88 illuminates the LCD panel 84 in amber. Displaying on the LCD panel 84 and color switching of back lighting will be described in some more detail afterwards. In the following description, reference to an LCDLED 1 (or LED 1) will mean the back lighting LED 86 in green, and reference to an LCDLED 2 (or LED 2) will mean the back lighting LED 88 in amber.

The on/off states of switches provided in different parts of the camera are entered into the CPU 60, and the different parts are controlled, setting of the shooting mode to be described afterwards and other operations are carried out according to the on/off states of those switches. Referring to FIG. 6, a switch /SM is turned on when the main switch 32 (see FIG. 2) of the camera is pressed and off when it is not pressed. A switch /SB is turned on when the rear lid 51 (see FIG. 3) of the camera for film loading and unloading is open and off when the rear lid 51 is closed. A switch /SP1 is turned on when the shutter release button 34 (see FIG. 2) is manually or fully pressed and off when it is neither manually nor fully pressed. A switch /SP2 is turned on when the shutter release button 34 is fully pressed and off when it is not pressed. A switch /STELE is turned on when the telescopic side of the zooming button 48 (see FIG. 3) is pressed and off when it is not pressed. A switch /SWIDE is turned on when the wide-angle side of the zooming button 48 is pressed and off when it is not pressed.

A switch /SMENU is turned on when the menu/decision button 42 (see FIG. 3) is pressed and off when it is not pressed. A switch /SUP is turned on when the upper side of the selector button 40 (see FIG. 3) is pressed and off when it is not pressed. A switch /SDOWN is turned on when the lower side of the selector button 40 is pressed and off when it is not pressed. A switch /SRIGHT is turned on when the right hand side of the selector button 40 is pressed and off when it is not pressed. A switch /SLEFT is turned on when the left hand side of the selector button 40 is pressed and off when it is not pressed.

Setting and changing of the shooting mode to be described in more detail afterwards can be accomplished mainly by manipulating the selector button 40 and the menu/decision button 42 while referencing displays on the LCD panel 84. The CPU 60 controls displays on the LCD panel 84, and at the same time sets or changes the mode of the camera based on the on/off states of the switch /SMENU, switch /SUP, switch /SDOWN, switch /SRIGHT and switch /SLEFT, which are turned on or off with those manipulating members. The CPU 60 then controls of the operations of different parts in the mode thereby set.

Further, the CPU 60 controls the turning on and off of the green back lighting LED 86 (LCDLED 1) and the amber back lighting LED 88 (LCDLED 2) and changes over the back light color of the LCD panel 84 between green and amber so that the user can readily whether the camera is in a definite mode (regular mode) or a selectable mode (selection mode).

Next will be described in detail how the CPU 60 processes the mode setting and changing. The aforementioned mode setting regarding flash, self-timer, focusing, date (date printing) and so forth can be accomplished by manipulating the selector button 40, the menu/decision button 42 and the like while referencing displays on the LCD panel 84 arranged on the rear face of the camera.

Figure 7:
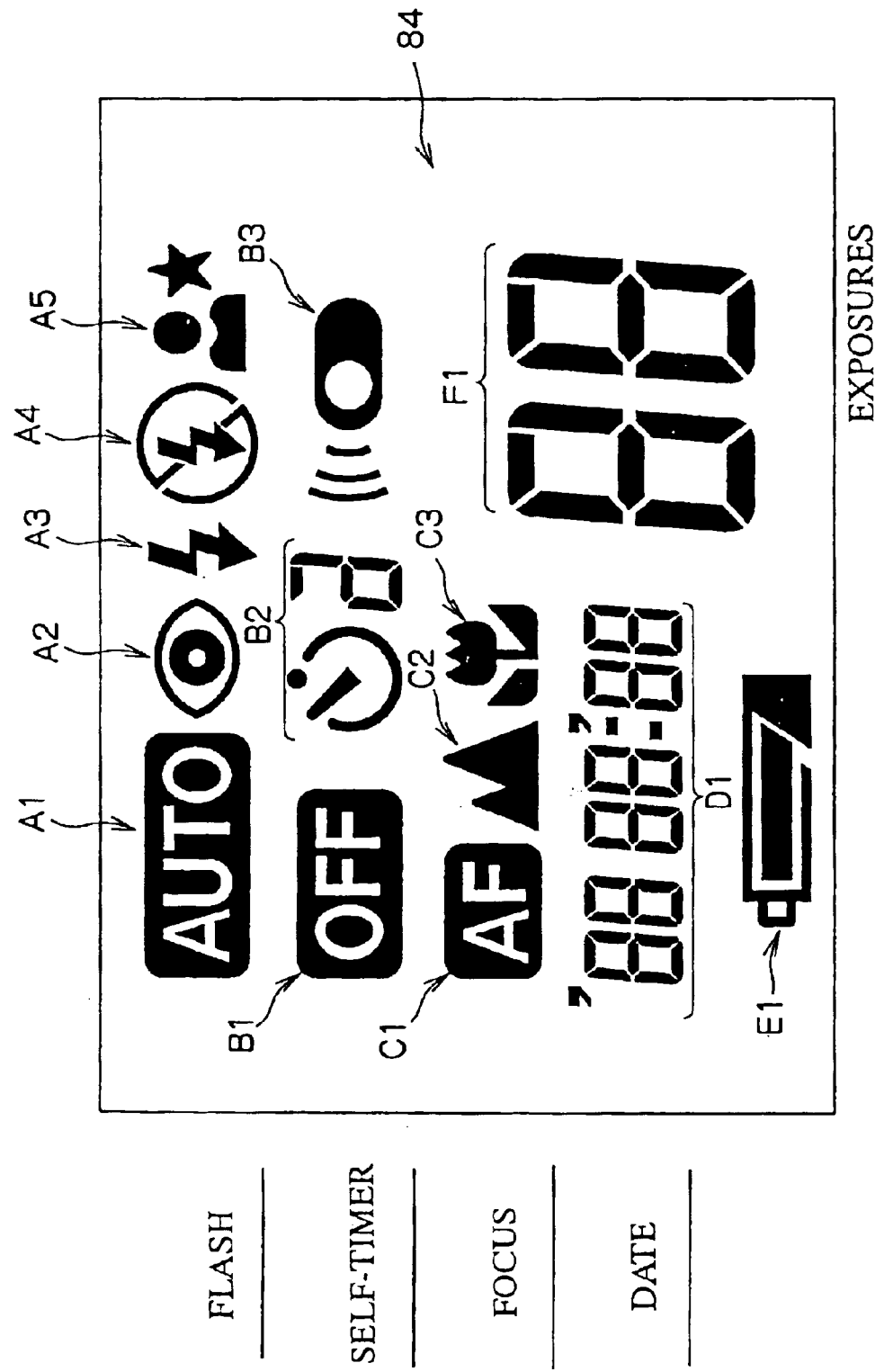
FIG. 7 shows a layout of segments for displaying various graphic patterns, letters and numerals on an LCD panel.

FIG. 7 shows a layout of segments for displaying various graphic patterns, letters and numerals on the LCD panel 84. As shown in FIG. 7, on the rear face (see FIG. 3) of the case 10 of the camera, the names of groups into which modes are classified according to their type, such as "flash", "self-timer", "focus" and "date" are printed to the left of the LCD panel 84. Matching these group names, segments (LCD segments) representing the shooting modes (hereinafter referred to as simply "modes") that can be selected in the respective groups are laid out in rows in the LCD panel 84, positioned to the right of the group names.

To explain what LCD segments there are in each group, for the "flash" group, from left to right the LCD panel 84 (in the first row), there are laid out AUTO segment A1 indicating a "low luminance auto flash" (AUTO) mode, PRE segment A2 indicating a "prevent red eye" (PRE) mode, ON segment A3 indicating an "all-time flash lamp lighting" (ON) mode, F-OFF segment A4 indicating a "flash lamp forbidding" (F-OFF) mode, and NVP segment A5 indicating a "night view portrait (slow synchro)" (NVP) mode. In the following description, any mode belonging to the "flash" group will be referred to as a FLASH mode.

For the "self-timer" group, from left to right the LCD panel 84 (in the second row), there are laid out S-OFF segment BI indicating an "off" (S-OFF) mode, SELF segment B2 indicating an "on" (SELF) mode and the number of self-shot pictures 1 to 3 and REMOCON segment B3 indicating a "remote control" (REMOCON) mode. A SELF mode is referred to as a SELF 1 mode when only one picture is to be taken automatically, a SELF 2 mode when two pictures are to be taken consecutively, or a SELF 3 mode when three pictures are to be taken consecutively. In the following description, any mode belonging to the "self-timer" group will be referred to as a SELF mode.

For the "focus" group, from left to right the LCD panel 84 (in the third row), there are laid out AF segment C1 indicating an "auto-focusing" (AF) mode, INF segment C2 indicating a fixed infinite-distance focusing" (INF) mode, and MACRO segment C3 indicating a "macro-focusing" (MACRO) mode. In the following description, any mode belonging to the "focus" group will be referred to as a FOCUS mode.

For the "date" group, from left to right the LCD panel 84 (in the fourth row), there is laid out an English letter-numeral segment D1 in which one of an "off" (D-OFF) mode, a "year-month-day print" mode, a "month-day-year print" mode, a "day-month-year print" mode and a "day-hour-minute print" mode is changeably displayed. In the D-OFF mode, letters "OFF" are lit and displayed in the English letter-numeral segment D1, and in any other mode, the date (and the time of the day) is displayed in the sequence in which it is actually printed, "year", "month" and "day" or "day", "hours" and "minutes". In the following description, any mode belonging to the "date" group will be referred to as a DATE mode.

In addition to these LCD segments, the LCD panel 84 has, underneath the English letter-numeral segment D1, a battery charge indicator segment E1 indicating the remaining charge of the battery, and to the right of the English letter-numeral segment D1 is laid out a numeral segment F1 indicating the remaining available exposures.

In setting a desired mode or changing the current mode, it is necessary to press the menu/decision button 42 in the regular mode and shift to a selection mode. Upon detection of the turning-on of the switch /SMENU, which is turned on and off with the menu/decision button 42, the CPU 60 shifts to the processing of the selection mode. When the power supply to the camera is turned on, selection of the respective automatic modes (AUTO mode and AF mode) to start with is made definite for the FLASH mode and the FOCUS mode.

The selection modes can be classified into a FLASH (flash) selection mode, a SELF (self) selection mode, a FOCUS (focusing) selection mode and a DATE (date) selection mode as shown in FIG. 8. In the FLASH selection mode, a desired FLASH mode can be selected. As stated above, modes available for choice as the FLASH mode include the AUTO mode, the PRE mode, the ON mode, the F-OFF mode and the NVP mode.

In the SELF selection mode, a desired SELF mode can be selected. Modes available for choice as the SELF mode include the S-OFF mode, the SELF 1 mode, the SELF 2 mode, the SELF 3 mode and the REMOCON mode.

In the FOCUS selection mode, a desired FOCUS mode can be selected. Modes available for choice as the FOCUS mode include the AF mode, the INF mode and the MACRO mode.

In the DATE selection mode, a desired DATE mode can be selected. Modes available for choice as the DATE mode include the D-OFF mode, the year-month-day print mode, the month-day-year print mode, the day-month-year print mode and the day-hour-minute print mode.

In any of these selection modes but the DATE selection mode, the LCD segment of the currently set one among the modes belonging to a group in the selection mode or, if the mode is switched over from one to another, the newly selected mode (the mode intended to be set next) is lit intermittently. The LCD segments of all others of the modes belonging to the group in the selection mode are continuously lit.

Changing over takes place among the FLASH selection mode, the SELF selection mode, the FOCUS selection mode and the DATE selection mode as a switch /SUP and a switch /SDOWN are manipulated (by moving the selector button 40 up and down). On the other hand, changing over also takes among the modes belonging to a group in each selection mode as a switch /SRIGHT and a switch /SLEFT are manipulated. When the switch /SMENU is turned on, the selection mode ends, and the selection of the mode by the manipulation of the switches is made definite. At the same time, while the LCDLED 2 (the back lighting LED 88 in amber) which was on during the selection mode goes off, the LCDLED 1 (the back lighting LED 86 in green) which was off during the selection mode comes on, and back light of the LCD panel 84 changes from green to amber. Under certain conditions, turning on the switch /SMENU results in a shift to a mode latch or the DATE correction mode.

In a selection mode, if any other switch than the switch /SMENU, switch /SUP, switch /SDOWN, switch /SRIGHT and switch /SLEFT (switch /SM switch /SB, switch /SP1, switch /STELE, switch /SWIDE or whatever else) is manipulated, the selection mode is immediately ended, and the choice of the mode then is made definite. At the same time, the LCDLED 1 or 2 goes off, and so does the back light of the LCD panel 84.

During a selection mode or the regular mode, if the LCDLED 1 or LCDLED 2 is on, when the absence of any switch manipulation continues for a length of time measured by an E_T_LCDLEDOFF timer (for instance 10 seconds), that on state is changed over to an off state, and the back light of the LCD panel 84 goes off.

It is also conceivable to forcibly make definite the choice of the mode then if the absence of any switch manipulation continues for a prescribed length of time in a selection mode, or not to accept any remote control input/SRCIN during a selection mode.

Figure 9:
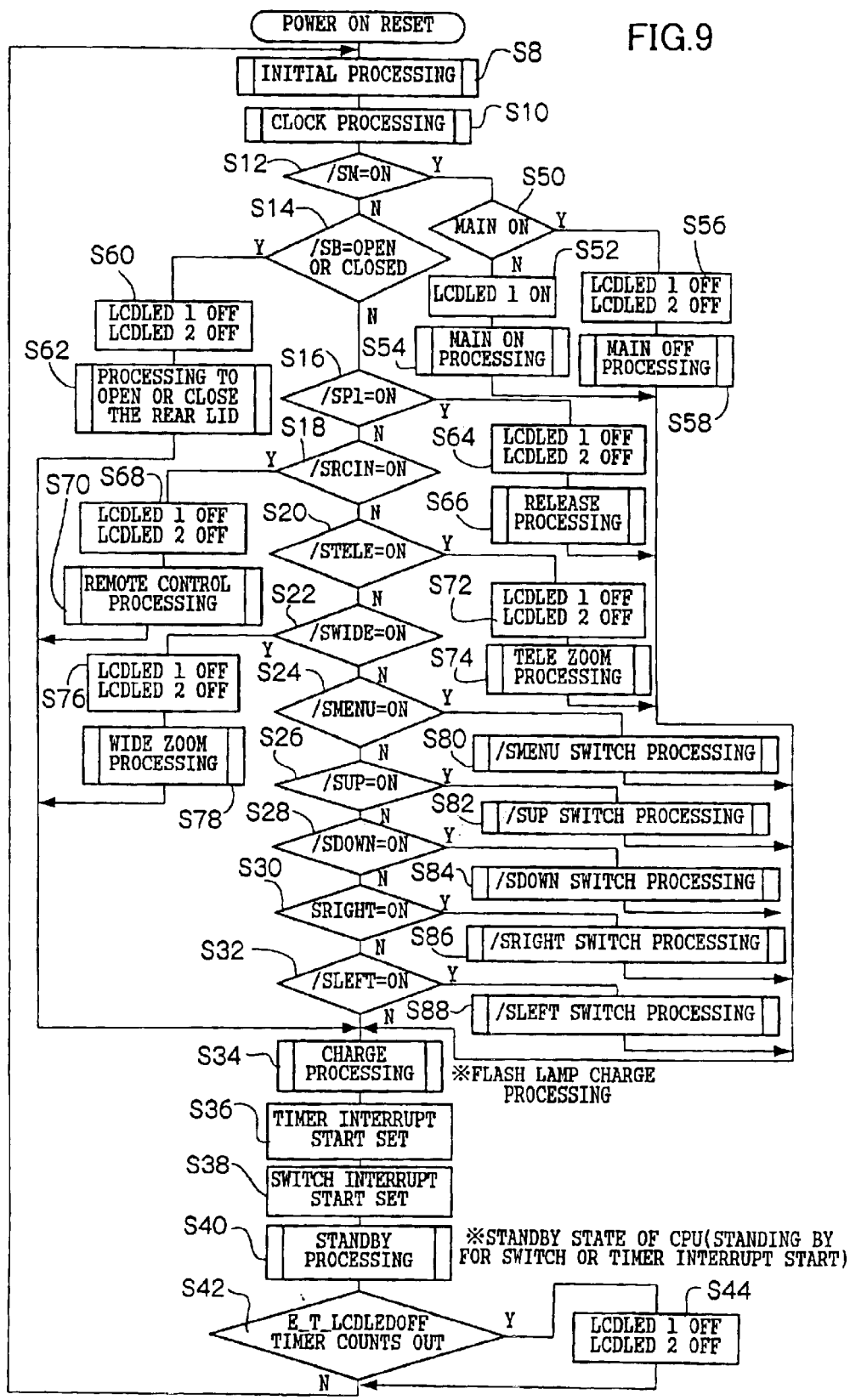
FIG. 9 is a flow chart showing the processing of a main routine by a CPU.

FIG. 9 is a flow chart showing the processing of a main routine by the CPU 60. When the replacement of the battery or the like causes the power-on state of the CPU 60 to be reset, as illustrated in FIG. 9, the CPU 60 first executes processing for initial setting, i.e. processing for the initial setting of the camera immediately after the CPU start-up (step S8), and then executes clock processing, i.e. clock count and display processing (step S10). After that, it checks whether the switches are on or not in succession. Thus the CPU 60 performs the on/off determination on the switch /SM turned on and off by the main switch 32 (see FIG. 2) (step S12), the switch /SB turned on and off by the opening and closing of the rear lid 51 (see FIG. 3) of the camera (open or closed) (step S14), the switch /SP1 turned on and off by the manual pressing of the shutter release button 34 (see FIG. 2) (step S16), a remote control input/SRCIN turned on and off by a remote control operation (step S18), the switch /STELE turned on and off by an operation of the zooming button 48 (see FIG. 3) (step S20), a switch /SWIDE turned on and off similarly by an operation of the zooming button 48 (see FIG. 3) (step S22), the switch /MENU turned on and off by an operation of the menu/decision button 42 (see FIG. 3) (step S24), the switch /SUP turned on and off by an operation of the selector button 40 (see FIG. 3) (step S26), the switch /SDOWN turned on and off similarly by an operation of the selector button 40 (see FIG. 3) (step S28), the switch /SRIGHT turned on and off similarly by an operation of the selector button 40 (see FIG. 3) (step S30), and the switch /SLEFT turned on and off similarly by an operation of the selector button 40 (see FIG. 3) (step S32).

Upon completion of required processing based on the foregoing determinations, the CPU 60, after processing for charging the flash lamp (step S34), sets timer interrupt start (step S36) and sets switch interrupt start (step S38). Then by standby processing, the CPU 60 enters into a state of standing by for switch or timer interrupt start. Upon the lapse of a set timer count period or a switch manipulation, the CPU 60 goes out of the standby state to shift to the next step (S42). It determines whether or not the prescribed length of time to be counted by the E_T_LCDLEDOFF timer (10 seconds) has passed (step S42) and, if it has, turns off the LCDLED 1 (the back lighting LED 88 in green) and the LCDLED 2 (the back lighting LED 88 in amber) (step S44) to be turned on by another step of processing to be described in more detail afterwards. The E_T_LCDLEDOFF timer is intended for measuring the duration of the absence of any switch manipulation as stated above.

The CPU 60 repeats the execution of the above-described processing from step S12 through step S44. It may be relevant to briefly described here the clock processing at step S10 with reference to a flow chart of FIG. 10. At the start of 250 ms from the standby processing at step S40, the CPU 60 counts up seconds data, and determines whether or not the mode is a DATE correction mode to be described in more detail afterwards (step S90). If it is, this clock processing is ended. Or if it is not, the CPU 60 determines whether or not the seconds data extend for 60 seconds or more (step S92). If they are not, it ends this clock processing. If they are, then the CPU 60 subtracts 60 seconds from the seconds data to correct them into a new set of seconds data (step S94), and sets data in the sequence of minutes, hours, day, month and year by clock count-up processing (step S96). On the basis of data so set, the CPU 60 causes a date to be lit and displayed in the English letter-numeral segment D1 of the LCD panel 84 (step S98).

Next will be described the processing that takes place when the on states of the switches are detected in the state determination procedure from step S12 through step S32 in the main routine of FIG. 9.

If at step S12 it is determined that the switch /SM is in an on state, the CPU 60 determines whether or not the main power source is already on (step S50). If it is not, the CPU 60 turns on the LCDLED 1 in green (step S52) to illuminate the LCD panel 84 in green, and executes processing that is required when the main power is on (step S54). Incidentally in this embodiment of the invention, when either the LCDLED 1 or the LCDLED 2 is on as at step S52, the other is off. If either the LCDLED 1 or the LCDLED 2 is turned on as a matter of processing by the CPU 60, it does not necessarily mean that the LCDLED 1 or the LCDLED 2 was off before, but it may have been already on. The same is true of processing in which either the LCDLED 1 or the LCDLED 2 is turned off (the same applies hereinafter).

On the other hand, if it is determined at step S50 that the main power source is already on, the CPU 60 turns off both the LCDLED 1 and the LCDLED 2 (step S56), and executes processing that is required to turn off the main power (step S58).

If it is determined at step S14 that the switch /SB is in an on state, the CPU 60 turns off both the LCDLED 1 and the LCDLED 2 (step S60), and executes processing to open or close the rear lid (step S62).

If it is determined at step S16 that the switch /SP1 is in an on state, the CPU 60 turns off both the LCDLED 1 and the LCDLED 2 (step S64), and executes shutter release processing (step S66).

If it is determined at step S18 that the remote control input/SRCIN is in an on state, the CPU 60 turns off both the LCDLED 1 and the LCDLED 2 (step S68), and executes remote control processing (step S70).

If it is determined at step S20 that the switch /STELE is in an on state, the CPU 60 turns off both the LCDLED 1 and the LCDLED 2 (step S72), and executes zoom processing in the telescopic direction (step S74).

If it is determined at step S22 that the switch /SWIDE is in an on state, the CPU 60 turns off both the LCDLED 1 and the LCDLED 2 (step S76), and executes zoom processing in the wide angle direction (step S78).

If it is determined at step S24 through step S32 that any of the switch /SMENU, switch /SUP, switch /SDOWN, switch /SRIGHT and switch /SLEFT is in an on state, the CPU 60 executes the matching one of the /SMENU switch processing (step S80), /SUP switch processing (step S82), /SDOWN switch processing (step S84), /SRIGHT switch processing (step S86) and /SLEFT switch processing (step S88). These steps of processing will be described in detail with reference to the flow chart in due sequence.

Figure 11:
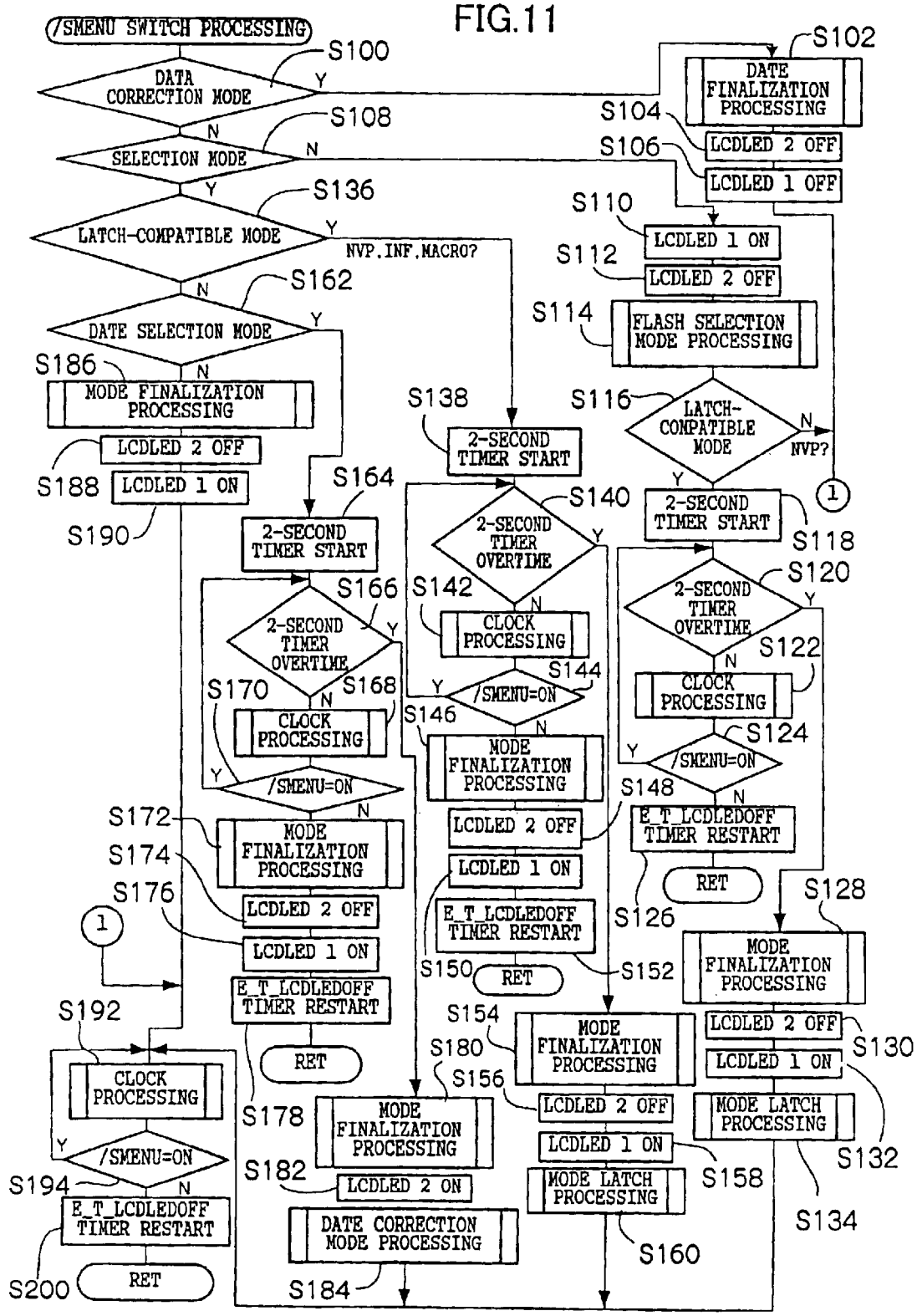
FIG. 11 is a flow chart showing the procedure of/SMENU switch processing.

FIG. 11 is a flow chart showing the procedure of /SMENU switch processing at step S80 of the main routine in FIG. 9 above. In this sequence of processing, the CPU 60 first determines whether or not the current mode is the DATE correction mode (step S100). The DATE correction mode is a mode to set or correct a date (year, month, day, hours and minutes). The shift to the DATE correction mode will be clearly stated in a later explanation of this flow chart. If it is determined that the current mode is the DATE correction mode, the CPU 60 executes DATE finalization processing to make definite the date corrected in the DATE correction mode (step S102). The CPU 60 then turns off the LCDLED 2 in amber that is turned on in the DATE correction mode (step S104), and turns on the LCDLED 1 in green (step S106). Particulars of the DATE finalization processing will also be described afterwards.

Figure 10:
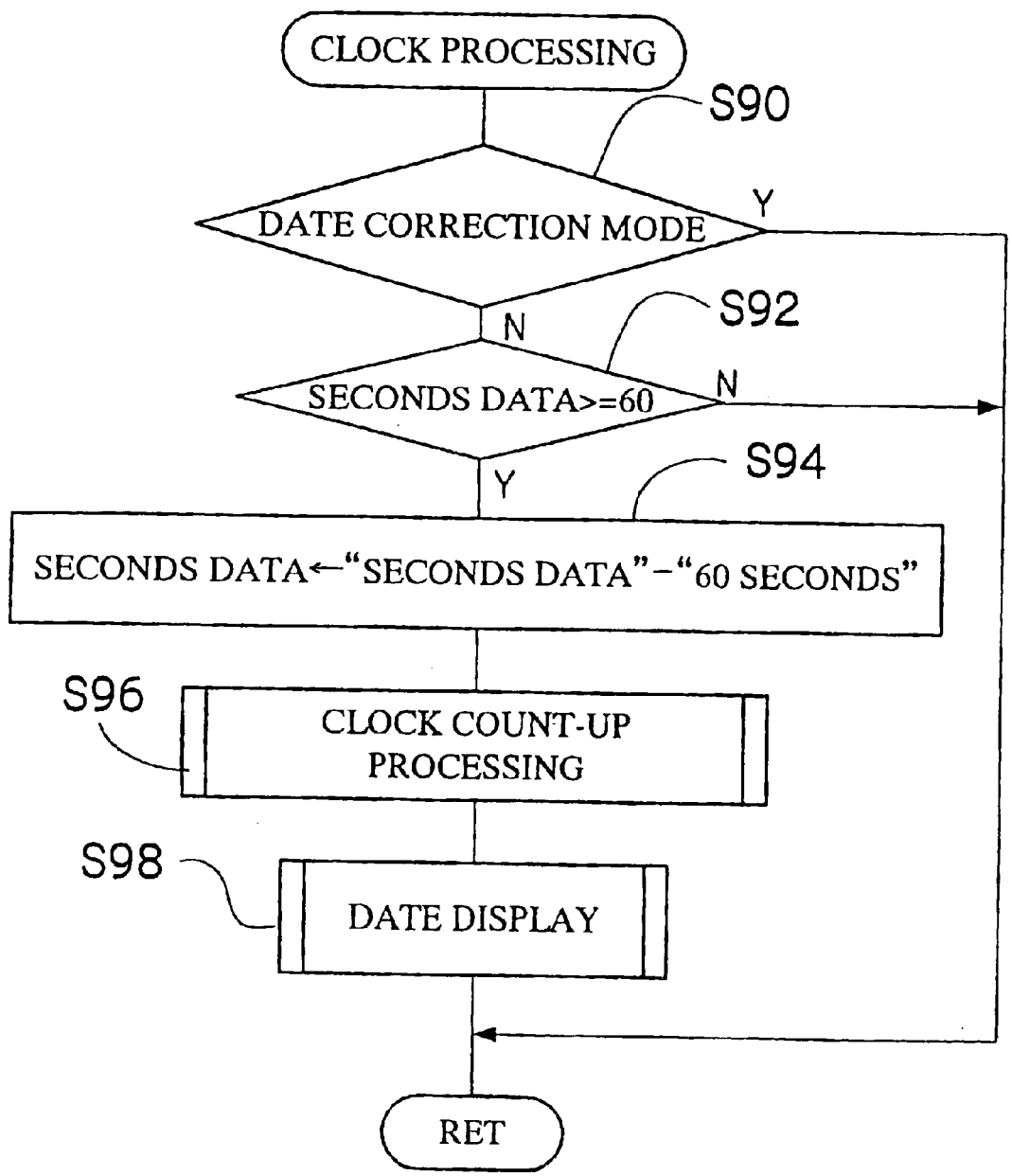
FIG. 10 is a flow chart showing clock processing.

Upon completion of this processing, the CPU 60 executes clock processing described with reference to FIG. 10 above (step S192) while checking whether or not the switch /SMENU is on (step S194) and determining it is, and stands by for the switch /SMENU to be turned off. When the switch /SMENU is turned off, the CPU 60 restarts the E_T_LCDLEDOFF timer for measuring the duration of the absence of any switch manipulation (step S200) because of the manipulation of the switch /SMENU to shift to this /SMENU switch processing, and returns to the main routine of FIG. 9.

If it is determined at step S100 above that the current mode is not the DATE correction mode, then the CPU 60 determines whether or not the mode is a selection mode (step S108). If it is determined that it is not, i.e. that the mode is the regular mode, the CPU 60 turns off the LCDLED 1 in green (step S110), and turns on the LCDLED 2 in amber (step S112). This results in lighting of the LCD panel 84 in amber, and thereby makes the shift to a selection mode known to the user. Then the CPU 60 executes processing in the FLASH selection mode (step S114). The initial selection mode upon shifting to a selection mode is the FLASH selection mode.

Hereupon, as processing in the FLASH selection mode, the CPU 60 causes the LCD segment of the LCD panel 84 to light intermittently in the currently selected one out of the FLASH modes (the AUTO mode, PRE mode, ON mode, F-OFF mode and NVP mode) made available for choice by the shifting to the FLASH selection mode and the LCD segments of other FLASH modes to be on continuously. In a special case, in which the INF mode out of the FLASH modes is selected, choice of the F-OFF mode alone is made possible, only the F-OFF segment A4 is caused to light intermittently, and the LCD segments of other FLASH modes are not allowed to light. When the MACRO mode out of the FOCUS modes is selected, choice of only the AUTO mode, ON mode and F-OFF mode is made possible, and the LCD segments of other FLASH modes are not allowed to light.

Next, the CPU 60 determines whether or not the currently selected mode is a latch-applicable mode (step S116). A latch-applicable mode is a mode to which the mode latching function is applicable. The mode latching function is a function to prevent, in a usual case (in an unlatched case), the mode of resetting into a predetermined mode when the shutter is released once (latch-applicable mode) from being reset. Out of the FLASH modes made selectable by the FLASH selection mode, the NVP mode is a latch-applicable mode. When the camera is set in the NVP mode and the shutter is released, it is reset to the AUTO mode if there is no latching. Latch-compatible modes belonging to other groups include the INF mode and the MACRO mode among the FOCUS modes. Every one of these modes is reset to the AF mode if the shutter is released in an unlatched state.

If it is determined at step S116 that the currently selected mode is a latch-applicable mode, i.e. the NVP mode, then the CPU 60 starts a 2-second timer (step S118). The CPU 60 executes clock processing (step S122) while checking whether or not the switch /SMENU is on (step S124) and, as long as it is determined it is on, and determines whether or not the 2-second timer has run overtime (step S120). If the switch /SMENU goes off before the 2-second timer runs overtime, it is determined at step S124 that the timer has not run overtime. In this case, the CPU 60 restarts the E_T_ LCDLEDOFF timer (step S126), and returns to the processing of the main routine of FIG. 9.

On the other hand, if the 2-second timer has gone time, the CPU 60 determines at step S120 that it has. In this case, the CPU 60 executes mode finalization processing (step S128), turns off the LCDLED 2 in amber (step S130) and, at the same time, turns on the LCDLED 1 in green (step S132). After executing mode latch processing (step S134), it shifts to step S192. The processing to stand by for the switch /SMENU to be turned off at and after step S192 is as described previously.

Hereupon, as the mode finalization processing at step S128 as described above, the CPU 60 makes definite the currently selected modes (the currently selected modes for all the groups), turns on the LCD segments of the finalized modes, and turns off the LCD segments of other modes, though the LCD segments of those modes whose latch is made definite by mode latch processing are caused to light intermittently.

Further, as the mode latch processing at step S134 described above, the CPU 60 sets with the aforementioned mode latching function the latch-applicable mode, i.e. the NVP mode, for latch to continue the NVP mode even after the shutter is released. It also causes the LCD segment of the NVP mode (NVP segment A5) whose latch has been made definite in this way to light intermittently.

Figure 12A:
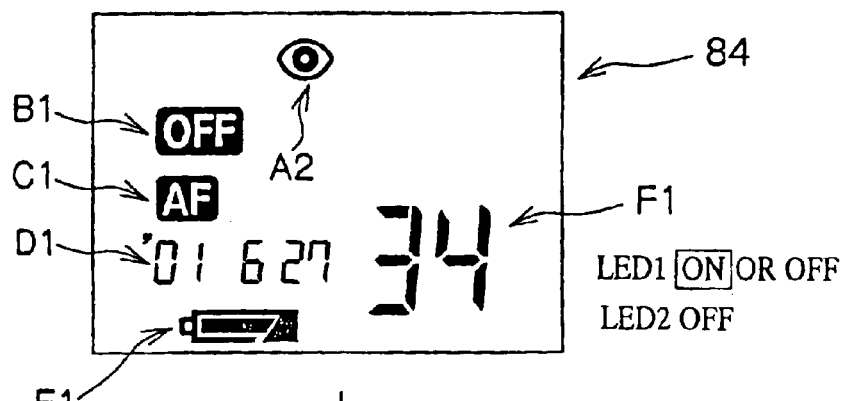

A series of processing steps by the CPU 60 when the switch /SMENU is turned on in a non-selection mode (in the regular mode) will now be described with reference to the manner of displaying on the LCD panel 84 by way of example. As shown in FIG. 12(A), it is supposed that the FLASH mode is set in any other mode than a latch-applicable mode, i.e. any other mode than the NVP mode, before the switch /SMENU is turned on. In FIG. 12(A), only the PRE segment A2 is on in a state in which the PRE mode is selected out of the FLASH modes. Incidentally, regarding the SELF modes, only the S-OFF segment B1 is lit in a state of being set to the S-OFF mode, and regarding the FOCUS modes, only the AF segment C1 is on in a state of being set to the AF mode. Regarding the DATE modes, the current "year", "month" and "day" are lit and displayed in this sequence in the English letter-numeral segment D1 in a state of being set to the year-month-day print mode. In the battery charge indicator segment E1, it is indicated that the remaining charge of the battery is sufficient, and in the numeral segment F1 the number of remaining available exposures is indicated to be 34.

Figure 12B:
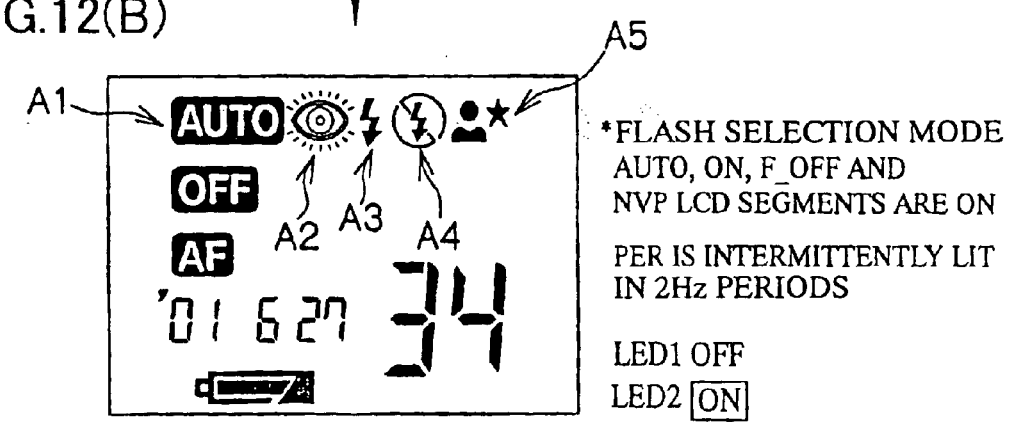

If in this case the switch /SMENU is turned on, the FLASH selection mode comes on and, as shown in FIG. 12(B), all the segments A1, A3, A4 and A5 except the PRE segment A2 are turned on for the FLASH modes to which the selection mode applies. On the other hand, the PRE segment A2 lights intermittently to indicate that the PRE mode is the currently selected mode. For the SELF modes, the FOCUS modes and the DATE modes not covered by the selection mode, the same segments are displayed as before the switch /SMENU was turned on.

Further referring to FIG. 12(A), before the switch /SMENU is turned on, the LCDLED 1 in green is either on or off and the LCDLED 2 in amber is off, and the back light of the LCD panel 84 is either on in green or off. Upon a shift to the selection mode of FIG. 12(B) after the switch /SMENU is turned on, the LCDLED 2 in amber is turned on in a state in which the LCDLED 1 in green is off, and the back light of the LCD panel 84 is on in amber.

Figure 13A:
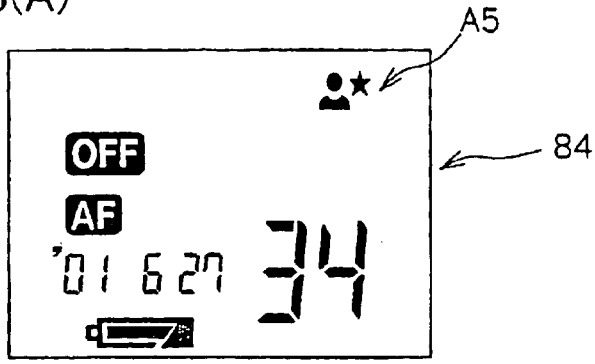

On the other hand, it is now supposed that, as shown in FIG. 13(A), the NVP segment A5 is lit on the LCD panel 84 in a state in which the FLASH mode is set to a latch-applicable mode, i.e. the NVP mode before the switch /SMENU is turned on. Since other modes that are set than the FLASH modes are the same as shown in FIG. 12(A) above and LCD segments lit on the LCD panel 84 also are the same, their description is dispensed with.

Figure 13B:
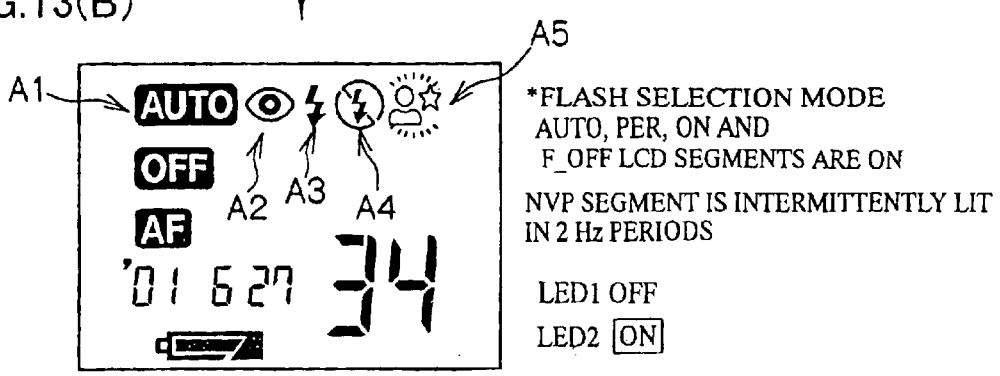

When the switch /SMENU is turned on in this state, the FLASH selection mode comes on and, as shown in FIG. 13(B), and all the LCD segments A1, A2, A3 and A4 of the FLASH modes except the NVP segment A5 are turned on. On the other hand, the NVP segment A5 lights intermittently to indicate that the NVP mode is the currently selected mode. For the SELF mode, the FOCUS mode, and the DATE mode not covered by the selection mode, the same segments are displayed as before the switch /SMENU was turned on.

Figure 13C:
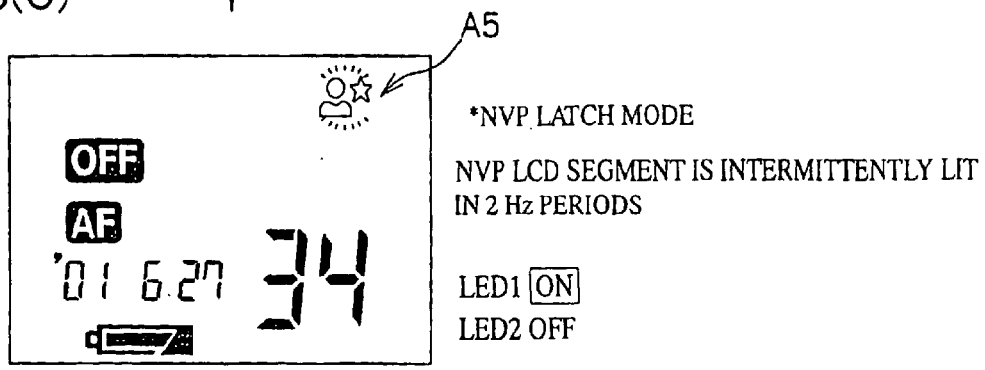

Then, if the on state of the switch /SMENU, which caused the change-over from the regular mode shown in FIG. 13(A) to the FLASH selection mode shown in FIG. 13(B), has continued for 2 seconds or more, the mode is made definite, and at the same time the NVP mode is latched. Then, as shown in FIG. 13(C), the NVP segment A5 lights intermittently to indicate that the NVP mode has been latched.

To add, at the time of changing over from the regular mode shown in FIG. 13(A) to the FLASH selection mode shown in FIG. 13(B), the back light of the LCD panel 84 changes over from either an on state in green or an off state to an on state in amber similarly to the case described with reference to FIGS. 12(A) and 12(B). Thus, in the state shown in FIG. 13(B), the LCDLED 1 in green is off and the LCDLED 2 in amber is on to indicate a selection mode. By contrast, when the shift from the FLASH selection mode shown in FIG. 13(B) to the regular mode shown in FIG. 13(C) takes place, in other words the mode is made definite, there is a change-over from a state in which the LCDLED 2 in amber is off while the LCDLED 1 in green is on, and the back light of the LCD panel 84 is on in green.

Next will be described a case in which it is determined in the affirmative at step S108 of FIG. 11 above, i.e. that the camera is in a selection mode. In this case, the CPU 60 then determines whether or not the currently selected mode is a latch-applicable mode as mentioned above out of the selection modes that can be selected (the FLASH selection mode, the SELF selection mode, the FOCUS selection mode or the DATE selection mode) (step S136). Thus, if the FLASH selection mode is selected as stated above, the CPU 60 determines whether or not the NVP mode is selected or, if the FOCUS selection mode is selected, it determines whether the INF mode or the MACRO mode is selected.

If the determination is in the affirmative here, the CPU 60 starts the 2-second timer (step S138). Then, while checking whether or not the switch /SMENU is on (step S144) and, as long as it determines that it is, the CPU 60 performs clock processing (step S142), and determines whether or not the 2-second timer has run overtime (step S140). If the switch /SMENU is turned off before the 2-second timer runs overtime, the determination at step S144 is negative. In this case, the CPU 60 executes mode finalization processing (step S146), turns off the LCDLED 2 in amber (step S148), and turns on the LCDLED 1 in green (step S150). It then restarts the E_T_LCDLEDOFF timer (step S152), and returns to the processing of the main routine shown in FIG. 9. Incidentally the mode finalization processing at step S146 is similar to the processing at step S128 above. When the switch /SMENU is turned off before the elapse of 2 seconds as in this case, no mode latch of a latch-applicable mode is performed.

On the other hand, if the 2-second timer has run overtime, the determination at step S140 is in the affirmative. In this case, the CPU 60 executes mode finalization processing (step S154), turns off the LCDLED 2 in amber (step S156), and turns on the LCDLED 1 in green (step S158). Then, after executing mode latch processing (step S160), it moves ahead to step S192. The processing to stand by for the turning-off of the switch /SMENU at and after step S192 is as described above. The mode finalization processing at step S154 here is similar to the processing at step S128 above, and the mode latch processing at step S160 is the same as the processing at step S134 above except that the latching mode may be different. It is also conceivable, conversely to the above, to perform mode latching if the duration of the switch /SMENU staying on is less than 2 seconds and cancel mode latching if the duration is no less than 2 seconds.

Now will be described, with reference to the manner of displaying on the LCD panel 84 by way of example, a series of processing by the CPU 60 where the switch /SMENU is turned on when the camera is in a selection mode as stated above and the currently selected mode is a latch-applicable mode. In a state in which the FOCUS selection mode is set before the switch /SMENU is turned on, the INF mode, which is a latch-applicable mode, was selected. Then, as shown in FIG. 14(A), the INF segment C2 of the LCD panel 84 lights intermittently and other LCD segments (the AF segment C1 and the MACRO segment C3) are continuously on for the FOCUS mode. To add, for the FLASH mode, only the F-OFF segment A4 is on in a state in which the F-OFF mode is selected and for the SELF mode, only the S-OFF segment B1 is on in a state in which the S-OFF mode is selected. Regarding the DATE modes, the current "year", "month" and "day" are lit and displayed in this sequence in the English letter-numeral segment D1 in a state in which to the year-month-day print mode is selected. Description of other displays will be dispensed with here.

If in this case the switch /SMENU is turned in less than 2 seconds, the selection mode is ended, and the mode selected in the selection mode is made definite. Then, as shown in FIG. 14(B), only the LCD segment of the finalized mode is lit. Unless the on state of the switch /SMENU continues for 2 seconds or longer, the latch-applicable mode is not latched, and its LCD segment also is on like those of other modes. Referring to FIG. 14(B), the INF mode, which is a latch-applicable mode, is not latched, and the INF segment C2 is lit.

Referring to FIG. 14(A), before the switch /SMENU is turned on, the LCDLED 2 in amber is on in a state in which the LCDLED 1 in green is off to indicate a selection mode, and the back light of the LCD panel 84 is on in amber, unless the absence of any switch manipulation continues for a length of time measured by the E_T_LCDLEDOFF (10 seconds) in the selection mode, in which case the back light of the LCD panel 84 is off.

By contrast, if the switch /SMENU is turned on in less than 2 seconds to shift to the regular mode shown in FIG. 14(B), there occurs a change-over to a state in which the LCDLED 1 in green is on, the LCDLED 2 in amber is off, and the back light of the LCD panel 84 is light in green.

On the other hand if, in the state shown in FIG. 14(A), the on state of the switch /SMENU has continued for 2 seconds or longer, the mode is made definite, and at the same time the selected latch-applicable mode is latched, and the LCD segment of that latch-applicable mode is lit intermittently. Referring to FIG. 14(A), since the selected latch-applicable mode is the INF mode out of the FOCUS modes, the INF mode is latched and, as shown in FIG. 14(C), the INF segment C2 is lit intermittently.

Next will be described a case in which the determination at step S136 in FIG. 11 above is negative, i.e. the mode currently selected in the selection mode is not a latch-applicable mode. In this case, the CPU 60 determines whether or not the currently selected selection mode is the DATE selection mode (step S162).

If it is determined in the affirmative, the CPU 60 starts the 2-second timer (step S164). Then, while checking whether or not the switch /SMENU is on (step S170) and, as long as it determines that it is, the CPU 60 performs clock processing (step S168), and determines whether or not the 2-second timer has run overtime (step S166). If the switch /SMENU is turned off before the 2-second timer runs overtime, the determination at step S170 is negative. In this case, the CPU 60 executes mode finalization processing (step S172), turns off the LCDLED 2 in amber (step S174), and turns on the LCDLED 1 in green (step S176). It then restarts the E_T_LCDLEDOFF timer (step S178), and returns to the processing of the main routine shown in FIG. 9. The mode finalization processing at step S172 is equivalent to those at step S128 and the like.

On the other hand, the 2-second timer has run overtime, the determination at step S166 is affirmative. In this case, the CPU 60 executes mode finalization processing (step S180), turns on the LCDLED 2 in amber (step S182), and shifts to the DATE correction mode to execute the DATE correction mode (step S184). The mode finalization processing at step S180 here is equivalent to those at step S128 and the like. On the other hand, the DATE correction mode is processed at step S184 to set the date and hours. Upon completion of these steps, the processing moves on to step S192. The processing to stand by for the turning-off of the switch /SMENU at and after step S192 is as described above.

Figure 15A:
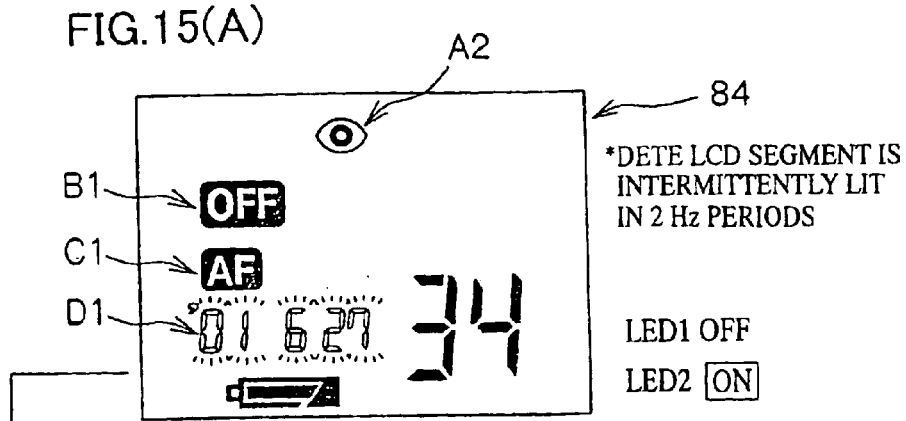
FIGS. 15(A), 15(B) and 15(C) show how the display screen of the LCD panel looks when the switch /SMENU is turned on in a DATE selection mode.

Now will be described, with reference to the manner of displaying on the LCD panel 84 by way of example, a series of processing by the CPU 60 where the switch /SMENU is turned on in the DATE selection mode. It is supposed that the camera was set in the DATE selection mode as shown in FIG. 15(A) before the switch /SMENU was turned on. Then, as shown in FIG. 15(A), the English letter-numeral segment D1 of the LCD panel 84 is lit intermittently. In the DATE mode as it is illustrated in FIG. 15(A), the current "year", "month" and "day" are displayed in this sequence by intermittent lighting in the English letter-numeral segment D1 in a state in which the year-month-day print mode is selected. Regarding the FLASH mode, only the PRE segment A2 is on in a state in which the PRE mode is selected; regarding the SELF mode, only the S-OFF segment B1 is on in a state in which the S-OFF mode is selected; and regarding the FOCUS mode, only the AF segment C1 is on in a state in which the AF mode is selected.

If in this case the switch /SMENU is turned on in less than 2 seconds, the DATE selection mode is ended, and the selected mode is made definite. Then, regarding the DATE mode, because the year-month-day print mode has been selected as shown in FIG. 15(A), the current "year", "month" and "day" are lit and displayed in this sequence in the English letter-numeral segment D1 as shown in FIG. 15(B).

Figure 15B:
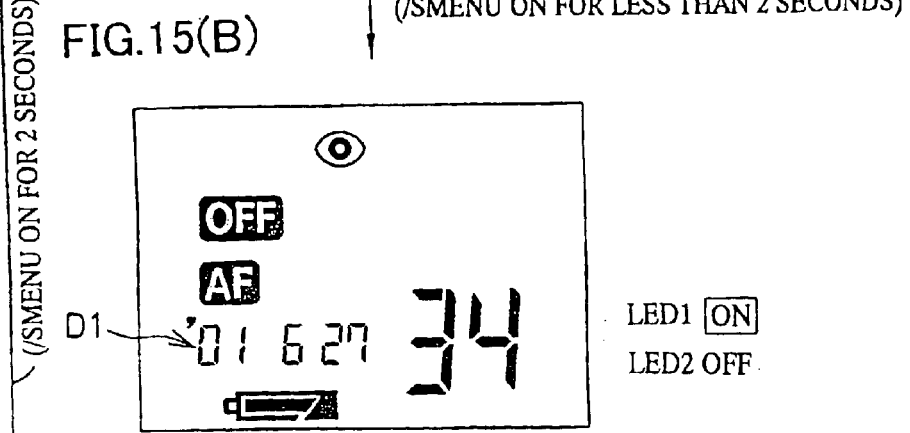

Referring to FIG. 15(A), before the switch /SMENU is turned on, the LCDLED 2 in amber is on in a state in which the LCDLED 1 in green is off to indicate a selection mode, but when the switch /SMENU is turned on in less than 2 seconds to make the mode definite and a shift to the regular mode of FIG. 15(B) takes place, there occurs a change-over to a state in which the LCDLED 1 in green is on, the LCDLED 2 in amber is off, and the back light of the LCD panel 84 is on in green.

Figure 15C:
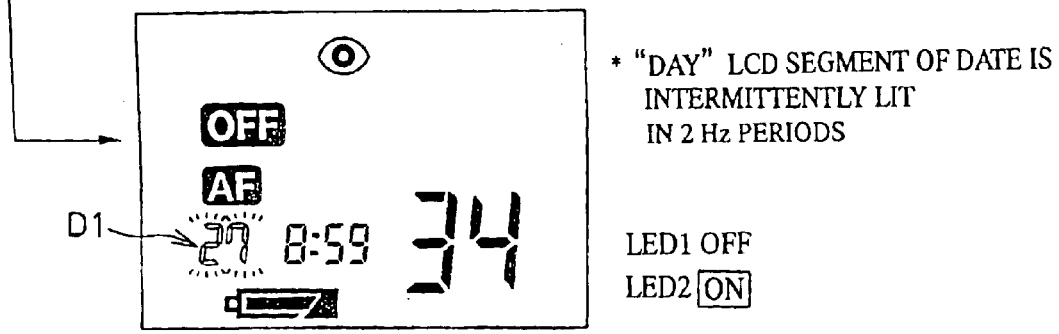

On the other hand if, in the state shown in FIG. 15(A), the on state of the switch /SMENU has continued for 2 seconds or more, there takes place a shift to the DATE correction mode and, as shown in FIG. 15(C), the "day", "hours" and "minutes" are lit and displayed in the English letter-numeral segment D1 in that sequence with the "day" display lighting intermittently. This enables the intermittent "day" display to be corrected (the "day" is the correctable column). Then, as will be described in further detail afterwards, the setpoint can be either raised or lower by 1 at a time by suitably manipulating the switch /SUP or the switch /SDOWN. It is also possible to change over the correctable column in the sequence of "day"⇔"hours"⇔"minutes" ⇔"year" ⇔"month"⇔"day" by suitably manipulating the switch /SRIGHT or the switch /SLEFT, with the correctable column being lit intermittently. Incidentally in the DATE correction mode, as in a selection mode, the LCDLED 2 in amber is on in a state in which the LCDLED 1 in green is off, and the back light of the LCD panel 84 is on in amber.

In connection with this shift to the DATE correction mode, the DATE finalization processing at step S102 of FIG. 11 above, i.e. the processing by the CPU 60 when the switch /SMENU is turned on in the DATE correction mode will be described with reference to the LCD panel 84 by way of example. If the DATE correction mode was set before the switch /SMENU is turned on, as shown in FIG. 16(A), the correctable column in the English letter-numeral segment D1 is intermittently lit as described above. In FIG. 16(A), the "day", "hours" and "minutes" are lit and displayed in the English letter-numeral segment DI in that sequence with the "minutes" display lighting intermittently to indicate that this column is correctable.

In this case, when the switch /SMENU is turned on, the corrected date (year, month, day, hours and minutes) is made definite, and the camera shifts to the regular mode. Then, as shown in FIG. 16(B), English letters and numerals matching the mode made definite before the shifting to the DATE correction mode are lit and displayed in the English letter-numeral segment D1 of the LCD panel 84. FIG. 16(B) illustrates a case set in the year-month-day print mode and, matching that mode, the current "year", "month" and "day" are lit and displayed in this sequence in the English letter-numeral segment D1.

In the DATE correction mode shown in FIG. 16(A), as described above, the LCDLED 2 in amber is on in a state in which the LCDLED 1 in green is off, and the back light of the LCD panel 84 is on in amber. By contrast after shifting to the regular mode shown in FIG. 16(B), the LCDLED 2 in amber is off in a state in which the LCDLED 1 in green is on, and the back light of the LCD panel 84 is on in green.

Next will be described a case in which the determination is negative at step S162 of FIG. 11 above, i.e., it is determined that the camera is not in the DATE selection mode. In this case, the CPU 60 executes mode finalization processing to make definite the mode selected in the selection mode (step S186) to shift to the regular mode, turns off the LCDLED 2 in amber (step S188), and turns on the LCDLED 1 in green (step S190). Then it shifts to step S192, waits for the turning-off of the switch /SMENU as stated above, restarts the _T_LCDLEDOFF timer (step S200), and returns to the main routine of FIG. 9. The mode finalization processing at step S186 here is equivalent to those at step S1128 and the like.

Now will be described the mode finalization processing with reference to the manner of displaying on the LCD panel 84 by way of example. It is supposed that the camera was set in the SELF selection mode before the switch /SMENU was turned on, and the SELF 2 mode out of the SELF modes was selected. Then, as shown in FIG. 17(A), the SELF segment B2 of the LCD panel 84 is lit intermittently for the SELF mode, and the LCD segments of other SELF modes (the S-OFF segment B1 and the REMOCON segment B3) are lit. In the FLASH mode as it is illustrated in FIG. 17(A), the PRE segment A2 is lit in a state in which the PRE mode is selected and the AF segment C1 is lit in a state in which the AF mode is selected. Regarding the DATE mode, the current "year", "month" and "day" are lit and displayed in this sequence in the English letter-numeral segment D1 in a state in which the year-month-day print mode is selected. Description of other displays is dispensed with here.

When the switch /SMENU is turned on in this case, the selection mode is ended, and the mode selected in the selection mode is made definite, followed by a shift to the regular mode in which, as shown in FIG. 17(B), only the LCD segments of the finalized modes are lit.

Further, before the switch /SMENU is turned on in the state shown in FIG. 17(A), the LCDLED 2 in amber is on in a state in which the LCDLED 1 in green is off to indicate a selection mode, and the back light of the LCD panel 84 is on in amber, unless the absence of any switch manipulation has continued for a length of time measured by the E_T_LCDLEDOFF (10 seconds) in the selection mode, in which case the back light of the LCD panel 84 is off.

By contrast, when the switch /SMENU is turned on to make the mode definite and shifting to the regular mode shown in FIG. 17(B) takes place, the LCDLED 2 in amber is off in a state in which the LCDLED 1 in green is on, and the back light of the LCD panel 84 is on in green.

Figure 18:
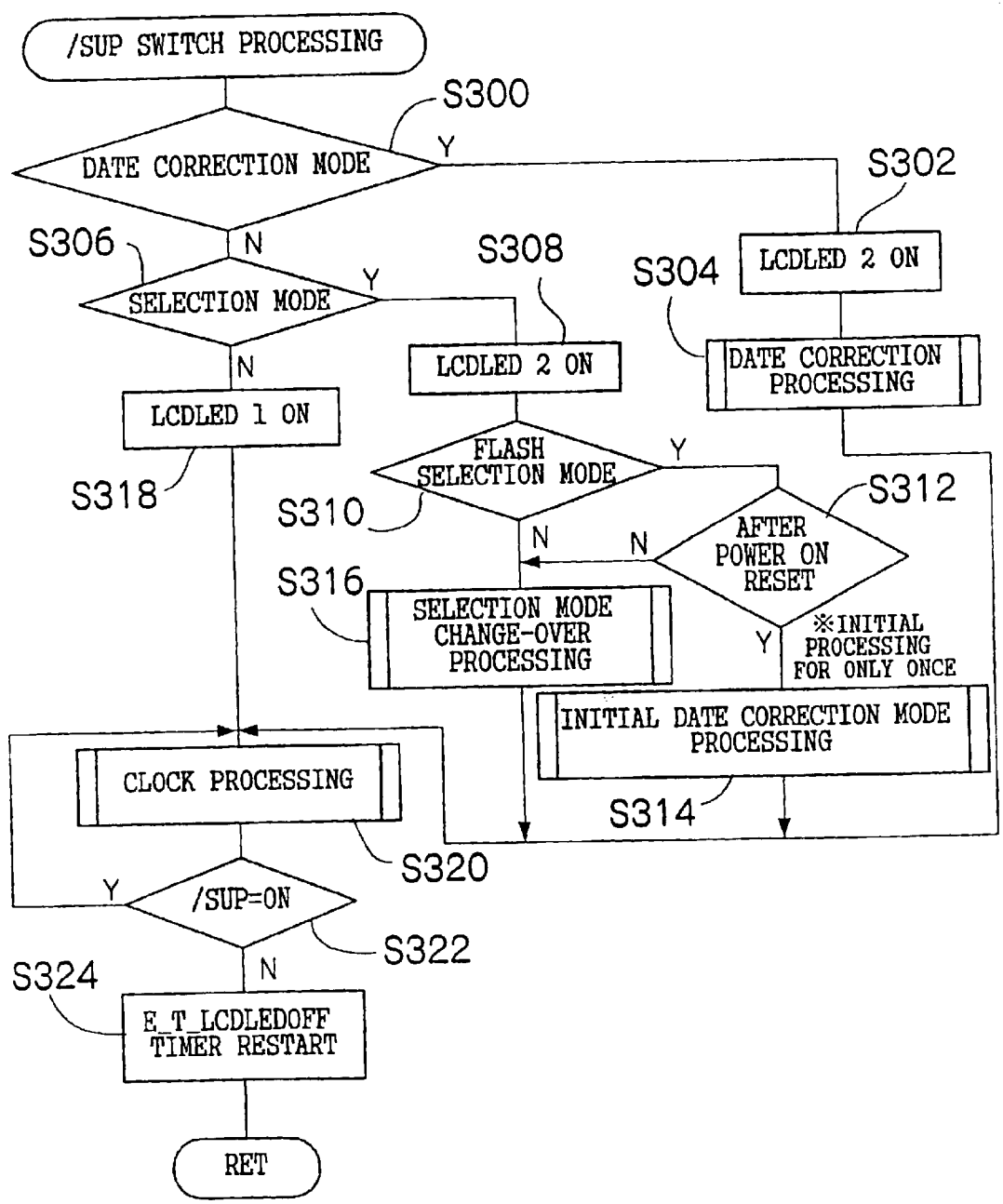
FIG. 18 is a flow chart showing the procedure of /SUP switch processing.

FIG. 18 is a flow chart showing the procedure of /SUP switch processing at step S82 in the main routine of FIG. 9 above. In this processing, the CPU 60 first determines whether or not the camera is in the DATE correction mode described above (step S300). If the determination is affirmative, it turns on the LCDLED 2 in amber (step S302), and executes DATE correction processing (step S304). Upon completion of this processing, while checking whether or not the switch /SUP is on (step S322) and, as long as it determines that it is, the CPU 60 executes the clock processing described with reference to FIG. 10 above (step S320), and waits for the turning-off of the switch /SUP. When the switch /SUP is turned off, the CPU 60 restarts the E_T_LCDLEDOFF timer for measuring the duration of the absence of any switch operation (step S324) in view of the fact that the switch /SUP was manipulated for shifting to this /SUP switching, and returns to the main routine of FIG. 9.

Figure 19A:
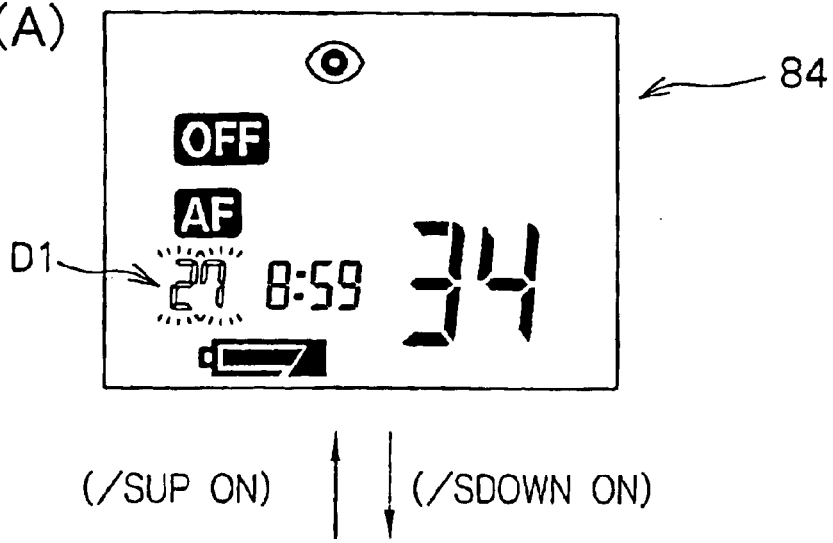
FIGS. 19(A), 19(B) and 19(C) show how the display screen of the LCD panel looks when switch /SUP and switch /SDOWN are turned on in the DATE correction mode.

Now will be described the series of processing by the CPU 60 when the switch /SUP is turned on in the DATE correction mode as described above with reference to the manner of displaying on the LCD panel 84 by way of example. It is supposed that the camera was set in the DATE correction mode before the switch /SUP was turned on, and the correction of "day" was selected. Then, as shown in FIG. 19(C), the "day" display in the English letter-numeral segment D1 of the LCD panel 84 is lit intermittently as the correctable column. The day is set to 25 in this illustration.

Figure 19B:
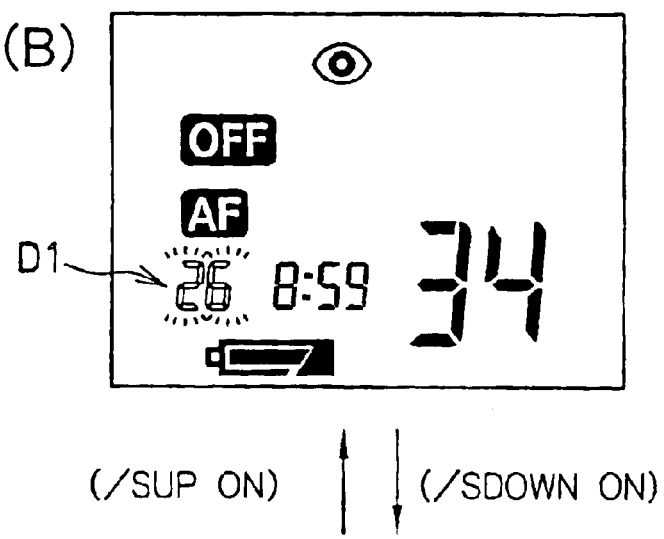
Figure 19C:
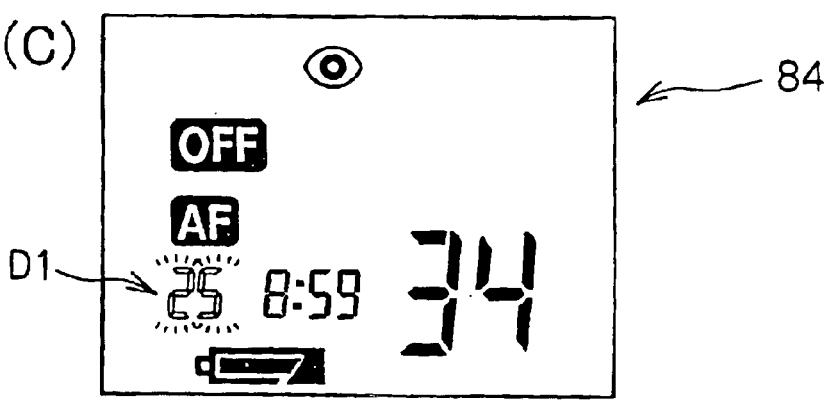

When the switch /SUP is turned on in this case, the setpoint of "day" is raised by 1 to be corrected to 26 as shown in FIG. 19(B). If the setpoint of "day" is 26 as in FIG. 19(B), it is corrected to 27 as shown in FIG. 19(A).

Figure 20A:
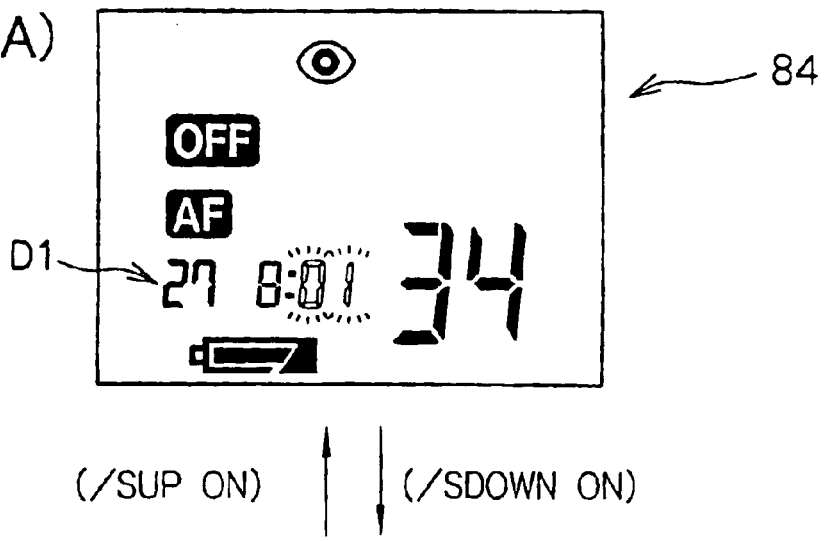
FIGS. 20(A), 20(B) and 20(C) show how the display screen of the LCD panel looks when switch /SUP and switch /SDOWN are turned on in the DATE correction mode.

In another example, it is supposed that, before the switch /SUP was turned on, the correction of "minutes" was selected in a state of being set in the DATE correction mode. Then, as shown in FIG. 20(C), the "minutes" display in the English letter-numeral segment D1 of the LCD panel 84 is lit intermittently as the correctable column. In the illustration, it is set to 59.

Figure 20B:
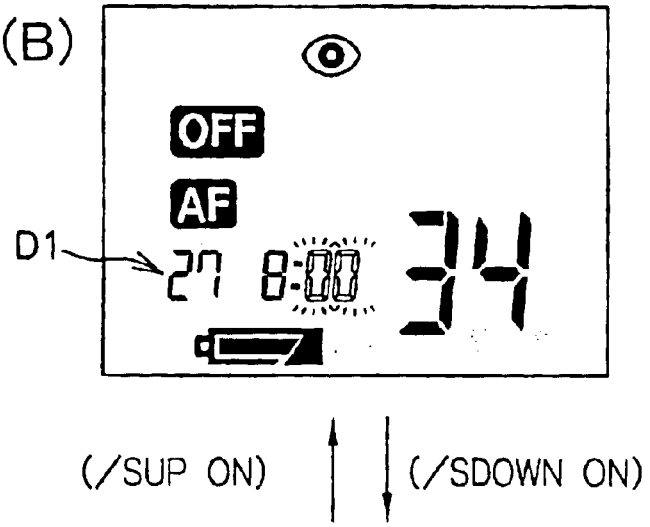
Figure 20C:
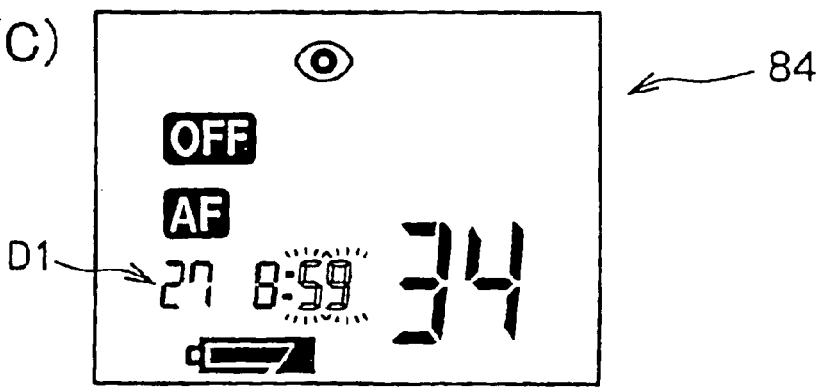

When the switch /SUP is turned on in this case, the setpoint of "minutes" is raised by 1 to be corrected to 00 as shown in FIG. 20(B). If the setpoint of "minutes" is set to 00 as in FIG. 20(B), it is corrected to 01 as shown in FIG. 20(A).

Next will be described a case in which the determination at step S300 in FIG. 18 above is negative, i.e. the camera is not in the DATE correction mode. In this case, the CPU 60 determines whether or not it is in a selection mode (step S306). If the determination is affirmative, i.e. it is a selection mode, the CPU 60 turns on the LCDLED 2 in amber (step S308) and turns on the back light of the LCD panel 84 in amber.

Then, the CPU 60 determines whether or not the camera is in the FLASH selection mode (step S310). If the determination here is affirmative, when the switch /SUP is turned on, usually a shift to the DATE selection mode takes place, but here it is first determined whether or not it is after a power-on reset (step S312). If the determination is affirmative, after executing initial DATE correction mode processing (step S314), a shift to step S320 takes place.

Figure 21A:
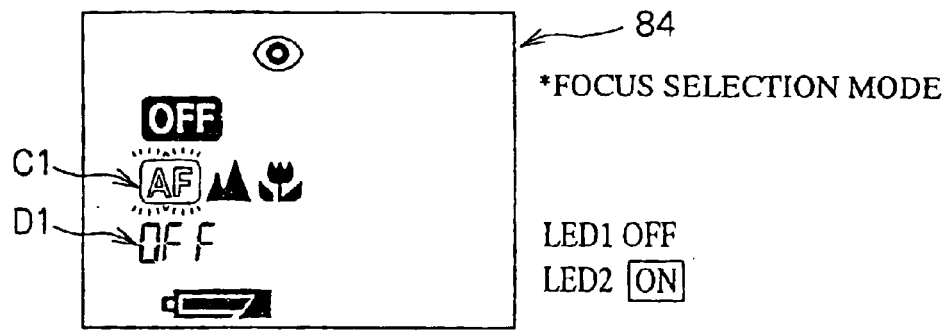
FIGS. 21(A), 21(B) and 21(C) show how the display screen of the LCD panel looks in shifting to initial DATE correction mode processing.

The initial DATE correction mode processing here is processing in the DATE correction mode that is performed when the DATE selection mode is to be selected for the first time after a power-on reset, and its content is basically the same as the above-described processing in the DATE correction mode. To describe a shift to initial DATE correction mode processing with reference to the manner of displaying on the LCD panel 84 by way of example, it is supposed that, after a power-on reset, the camera is set in the FLASH selection mode before the switch /SUP is turned on. As shown in FIG. 21(C), regarding the FLASH mode, the LCD segment of the LCD panel 84 matching the currently selected mode is lit intermittently. As illustrated here, the PRE segment A2 of the LCD panel 84 is lit intermittently in a state in which the PRE mode is selected. Regarding the DATE mode, "OFF" is displayed in the English letter-numeral segment D1 in a state in which the D-OFF mode is selected.

Figure 21B:
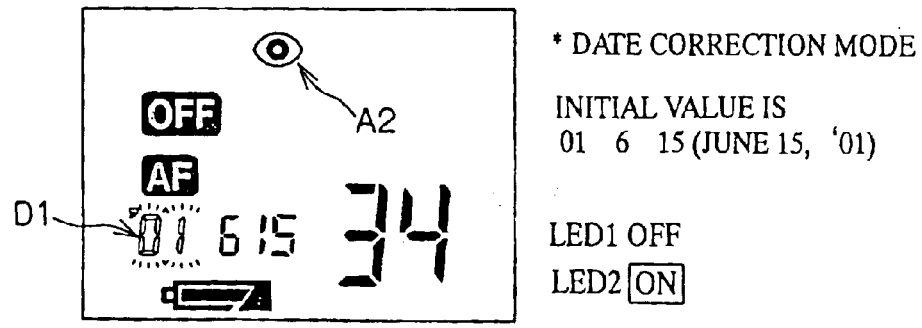
Figure 21C:
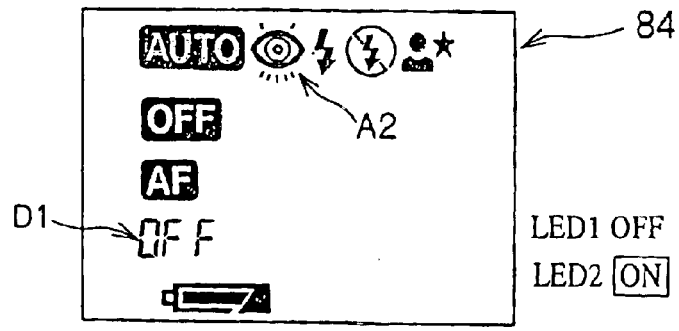

When the switch /SUP is turned on in this case, there takes place a shift to initial DATE correction mode processing and, as shown in FIG. 21(B), the PRE segment A2 of the LCD panel 84 changes over from intermittent lighting to continuous lighting. Further in the English letter-numeral segment D1 of the LCD panel 84, the initial values of "year", "month" and "day", which are initially set after the power-on reset, are displayed in this sequence, and the initial value of "year" is intermittently lit as the initial correctable column while those of "month" and "day" are continuously lit.

While the LCDLED 2 in amber is on in a state in which the LCDLED 1 in green is off as stated above to indicate a selection mode before the switch /SUP is turned on as shown in FIG. 21(C), even after the switch /SUP is turned on with a shift to initial DATE correction mode processing shown in FIG. 21(B), the LCDLED 2 in amber is on in a state in which the LCDLED 1 in green is off, and the back light of the LCD panel 84 is on in amber.

Then, if the determination is negative at step S310 of FIG. 18 above, i.e. the camera is not in the FLASH selection mode, or if the determination is negative at step S312 above, i.e. initial DATE correction mode processing is already performed, the CPU 60 executes selection mode change-over processing to change over the selection mode to the FLASH selection mode, the SELF selection mode, the FOCUS selection mode or the DATE selection mode (step S316). Upon completion of this processing, the CPU 60 moves on to step S320 to execute the clock processing as described above, re-starts the E_T_LCDLEDOFF timer (step S324) when the switch /SUP has been turned off (step S322), and returns to the main routine of FIG. 9. Selection mode change-over processing at step S316 above will be described in further detail afterwards.

If the determination at step S306 above is negative, i.e. the camera is not in a selection mode, the CPU 60, instead of executing any special processing, turns on the LCDLED 1 in green (step S318), moves on to step S320 and, when the switch /SUP has been turned off, returns to the main routine of FIG. 9.

Next will be described selection mode change-over processing at step S316 above with reference the manner of displaying on the LCD panel 84 by way of example. Selection mode change-over processing is performed when the switch /SUP is turned on in a state of being set to any of the selection modes including the FLASH selection mode, the SELF selection mode, the FOCUS selection mode, and the DATE selection mode. Every time the switch /SUP is turned on, the selection mode cyclically changes over in such a sequence as the FLASH selection mode→the DATE selection mode→the FOCUS selection mode→the SELF selection mode→the FLASH selection mode.

It is supposed that, before the switch /SUP is turned on, for instance the camera is set in the FLASH selection mode. FIG. 22(E) shows an example of display on the LCD panel 84 then. Incidentally, when the camera is set in the FLASH selection mode, the LCD segments of all the selectable FLASH modes are displayed, but FIG. 22(E) shows only the F-OFF segment A4 of the F-OFF mode. The reason for this display is that, as the selected FOCUS mode is the INF mode, the selection of any other FLASH mode than the F-OFF mode is forbidden. If the selected FOCUS mode is the AF mode, any FLASH mode can be selected, and if the selected FOCUS mode is the MACRO mode, the AUTO mode, the ON mode and the F-OFF mode are selectable. Thus, when the switch /SUP is turned on in the FLASH selection mode, a shift to the DATE selection mode takes place as shown in FIG. 22(D), and the display in the English letter-numeral segment D1 for displaying the DATE mode is lit intermittently.

Similarly, when the switch /SUP is turned on in the DATE selection mode as shown in FIG. 22(D), a shift to the FOCUS selection mode takes place as shown in FIG. 22(C), and the LCD segments of the selectable FOCUS modes are displayed. In FIG. 22(C), the INF segment C2 of the currently selected INF mode out of the AF mode, the INF mode and the MACRO mode, which are the FOCUS modes, is intermittently lit, and the AF segment C1 of the AF mode and the MACRO segment C3 are continuously lit.

Or when the switch /SUP is turned on in the FOCUS selection mode as shown in FIG. 22(C), a shift to the SELF selection mode takes place as shown in FIG. 22(B), and the LCD segments of the selectable SELF modes are displayed. As illustrated, the S-OFF mode out of the SELF modes is selected, and the S-OFF segment B1 is lit intermittently, with the others including the SELF segment B2 and the REMOCON segment B3 being lit continuously. Incidentally, the SELF segment B2 displays the SELF 1 mode.

When the switch /SUP is turned on in the SELF selection mode as shown in FIG. 22(B), a shift to the FLASH selection mode takes place as shown in FIG. 22(A). Thus, it is a return to the selection mode shown in FIG. 22(E).

Figure 23:
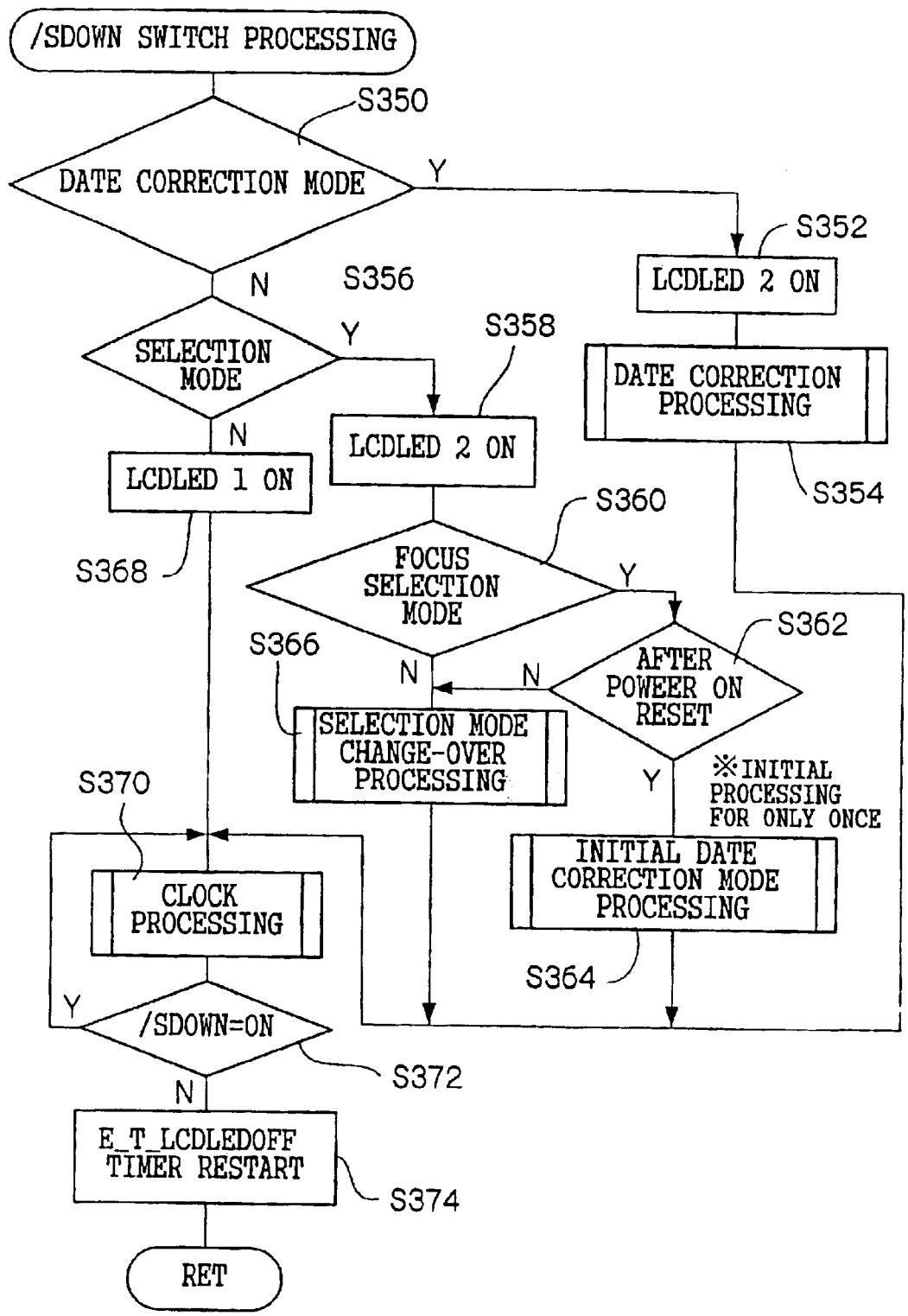
FIG. 23 is a flow chart showing the procedure of /SDOWN switch processing.

FIG. 23 is a flow chart showing the procedure of /SDOWN switch processing at step S84 of the main routine of FIG. 9 above. Its content is substantially the same as the above-described processing in the /SUP switch processing shown in FIG. 18 above. In this processing, the CPU 60 first determines whether or not the camera is in the DATE correction mode described above (step S350). If it is determined in the affirmative, the CPU 60 turns on the LCDLED 2 in amber (step S352), and executes DATE correction processing (step S354). Upon completion of this processing, the CPU 60 executes clock processing described with reference to FIG. 10 above (step S370) while checking whether or not the switch /SDOWN is on (step S372) and, as long as it is determined it is on, waits until the switch /SDOWN is turned off. When the switch /SDOWN is turned off, the CPU 60 restarts the E_T_LCDLEDOFF timer for measuring the duration of the absence of any switch operation (step S374) in view of the fact that the switch /SDOWN was manipulated for shifting to this /SDOWN switching, and returns to the main routine of FIG. 9.

Now will be described the series of processing by the CPU 60 when the switch /SDOWN is turned on in the DATE correction mode as described above with reference to the manner of displaying on the LCD panel 84 by way of example. It is supposed that the camera was set in the DATE correction mode before the switch /SDOWN was turned on, and the correction of "day" was selected. Then, as shown in FIG. 19(A), the "day" display in the English letter-numeral segment D1 of the LCD panel 84 is lit intermittently as the correctable column. The day is set to 27 in this illustration.

When the switch /SDOWN is turned on in this case, the setpoint of "day" is lowered by 1 to be corrected to 26 as shown in FIG. 19(B). If the setpoint of "day" is 26 as in FIG. 19(B), it is corrected to 25 as shown in FIG. 19(C).

In another example, it is supposed that, before the switch /SDOWN was turned on, the correction of "minutes" was selected in a state of being set in the DATE correction mode. Then, as shown in FIG. 20(A), the "minutes" display in the English letter-numeral segment D1 of the LCD panel 84 is lit intermittently as the correctable column. In the illustration, it is set to 01.

When the switch /S DOWN is turned on in this case, the setpoint of "minutes" is lowered by 1 to be corrected to 00 as shown in FIG. 20(B). If the setpoint of "minutes" is set to 00 as in FIG. 20(B), it is corrected to 59 as shown in FIG. 20(C).

Next will be described a case in which the determination at step S350 in FIG. 23 above is negative, i.e. the camera is not in the DATE correction mode. In this case, the CPU 60 determines whether or not it is in a selection mode (step S356). If the determination is affirmative, i.e. it is a selection mode, the CPU 60 turns on the LCDLED 2 in amber (step S358) and turns on the back light of the LCD panel 84 in amber.

Then, the CPU 60 determines whether or not the camera is in the FOCUS selection mode (step S360). If the determination here is affirmative, when the switch /SDOWN is turned on, usually a shift to the DATE selection mode takes place, but here it is first determined whether or not it is after a power-on reset (step S362). If the determination is affirmative, after executing initial DATE correction mode processing (step S364), a shift to step S370 takes place.

The initial DATE correction mode processing here is processing in the DATE correction mode that is performed when the DATE selection mode is to be selected for the first time after a power-on reset. To describe a shift to initial DATE correction mode processing when the switch /SDOWN is turned on with reference to the manner of displaying on the LCD panel 84 by way of example, it is supposed that, after a power-on reset, the camera is set in the FOCUS selection mode before the switch /SDOWN is turned on. As shown in FIG. 21(A), regarding the FOCUS mode, the LCD segment of the LCD panel 84 matching the currently selected mode is lit intermittently. As illustrated here, the AF segment C1 of the LCD panel 84 is lit intermittently in a state in which the AF mode is selected. Regarding the DATE mode, "OFF" is displayed in the English letter-numeral segment D1 in a state in which the D-OFF mode is selected.

When the switch /SDOWN is turned on in this case, there takes place a shift to initial DATE correction mode processing and, as shown in FIG. 21(B), the AF segment A2 of the LCD panel 84 changes over from intermittent lighting to continuous lighting. Further in the English letter-numeral segment D1 of the LCD panel 84, the initial values of "year", "month" and "day", which are initially set after the power-on reset, are displayed in this sequence, and the initial value of "year" is intermittently lit as the initial correctable column while those of "month" and "day" are continuously lit.

While the LCDLED 2 in amber is on in a state in which the LCDLED 1 in green is off as stated above to indicate a selection mode before the switch /SDOWN is turned on as shown in FIG. 21(A), even after the switch /SDOWN is turned on with a shift to initial DATE correction mode processing shown in FIG. 21(B), the LCDLED 2 in amber is on in a state in which the LCDLED 1 in green is off, and the back light of the LCD panel 84 is on in amber.

Then, if the determination is negative at step S360 of FIG. 23 above, i.e. the camera is not in the FOCUS selection mode, or if the determination is negative at step S362 above, i.e. initial DATE correction mode processing is already performed, the CPU 60 executes selection mode change-over processing to change over the selection mode to the FLASH selection mode, the SELF selection mode, the FOCUS selection mode or the DATE selection mode (step S366). Upon completion of this processing, the CPU 60 moves on to step S370 to execute the clock processing as described above, re-starts the E_T_LCDLEDOFF timer (step S374) when the switch /SDOWN has been turned off (step S372), and returns to the main routine of FIG. 9. Selection mode change-over processing at step S366 above will be described in further detail afterwards.

If the determination at step S356 above is negative, i.e. the camera is not in a selection mode, the CPU 60, instead of executing any special processing, turns on the LCDLED 1 in green (step S368), moves on to step S370 and, when the switch /SDOWN has been turned off, returns to the main routine of FIG. 9.

Next will be described selection mode change-over processing at step S366 above with reference the manner of displaying on the LCD panel 84 by way of example. When the switch /SDOWN is turned on, as when the switch /SUP is turned on, the selection mode cyclically changes over in such a sequence as the FLASH selection mode→the SELF selection mode→the FOCUS selection mode→the DATE selection mode→the FLASH selection mode.

It is supposed that, before the switch /SDOWN is turned on, for instance the camera is set in the FLASH selection mode, and that the LCD segments of the LCD panel 84 are displayed as shown in FIG. 22(A). When the switch /SDOWN is turned on even in the FLASH selection mode as in this case, a shift to the SELF selection mode takes place, and the LCD segments of the selectable SELF modes are displayed as shown in FIG. 22(B). In FIG. 22(B), the S-OFF mode out of the SELF modes is currently selected, and the S-OFF segment B1 is lit intermittently. Other segments including the SELF segment B2 and the REMOCON segment B3 are lit continuously. Incidentally, the SELF segment B2 displays the SELF 1 mode.

Similarly, when the switch /SDOWN is turned on in the SELF selection mode as shown in FIG. 22(B), a shift to the FOCUS selection mode takes place as shown in FIG. 22(C), and the LCD segments of the selectable FOCUS modes are displayed. In FIG. 22(C), the INF segment C2 of the currently selected INF mode out of the AF mode, the INF mode and the MACRO mode, which are the FOCUS modes, is intermittently lit, and the AF segment C1 of the AF mode and the MACRO segment C3 are continuously lit.

Or when the switch /SDOWN is turned on in the FOCUS selection mode as shown in FIG. 22(C), a shift to the DATE selection mode takes place as shown in FIG. 22(D), and the display of the English letter-numeral segment D1 displaying the DATE mode is intermittently lit.

When the switch /SDOWN is turned on in the DATE selection mode as shown in FIG. 22(D), a shift to the FLASH selection mode takes place as shown in FIG. 22(E). Thus, it is a return to the selection mode shown in FIG. 22(A).

Figure 24:
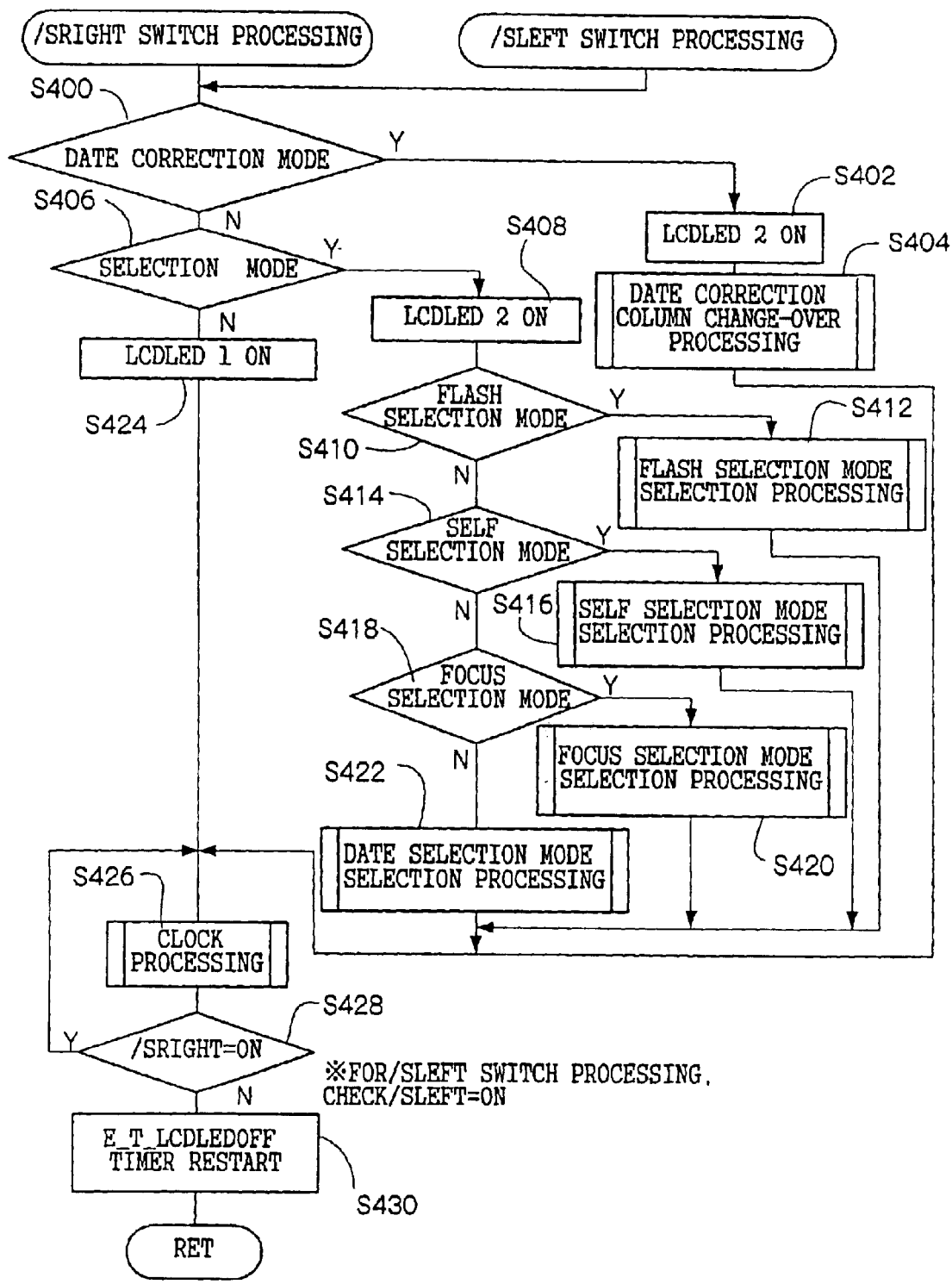
FIG. 24 is a flow chart showing together the procedures of /SRIGHT switch processing and /SLEFT switch processing.

FIG. 24 is a flow chart showing together the procedures of /SRIGHT switch processing at step S86 and /SLEFT switch processing at step S88 in the main routine of FIG. 9 above. In the following description, /SRIGHT switch processing that takes place when the switch /SRIGHT is turned on will be referred to, and similar processing is understood to be taken place when the switch /SLEFT is turned on unless otherwise stated specifically. In this processing, the CPU 60 first determines whether or the camera is in the DATE correction mode described above (step S400). If the determination is affirmative, the CPU 60 turns on the LCDLED 2 in amber (step S402) and executes DATE correct column change-over processing (step S404). Upon completion of this processing, the CPU 60 executes clock processing described with reference to FIG. 10 above (step S426) while checking whether or not the switch /SRIGHT is on (step S428) and, as long as it is determined it is on, waits until the switch /SRIGHT is turned off. When the switch /SRIGHT is turned off, the CPU 60 restarts the E_T_LCDLEDOFF timer for measuring the duration of the absence of any switch operation (step S430) in view of the fact that the switch /SRIGHT was manipulated for shifting to this /SRIGHT switch processing, and returns to the main routine of FIG. 9.

Figure 25:
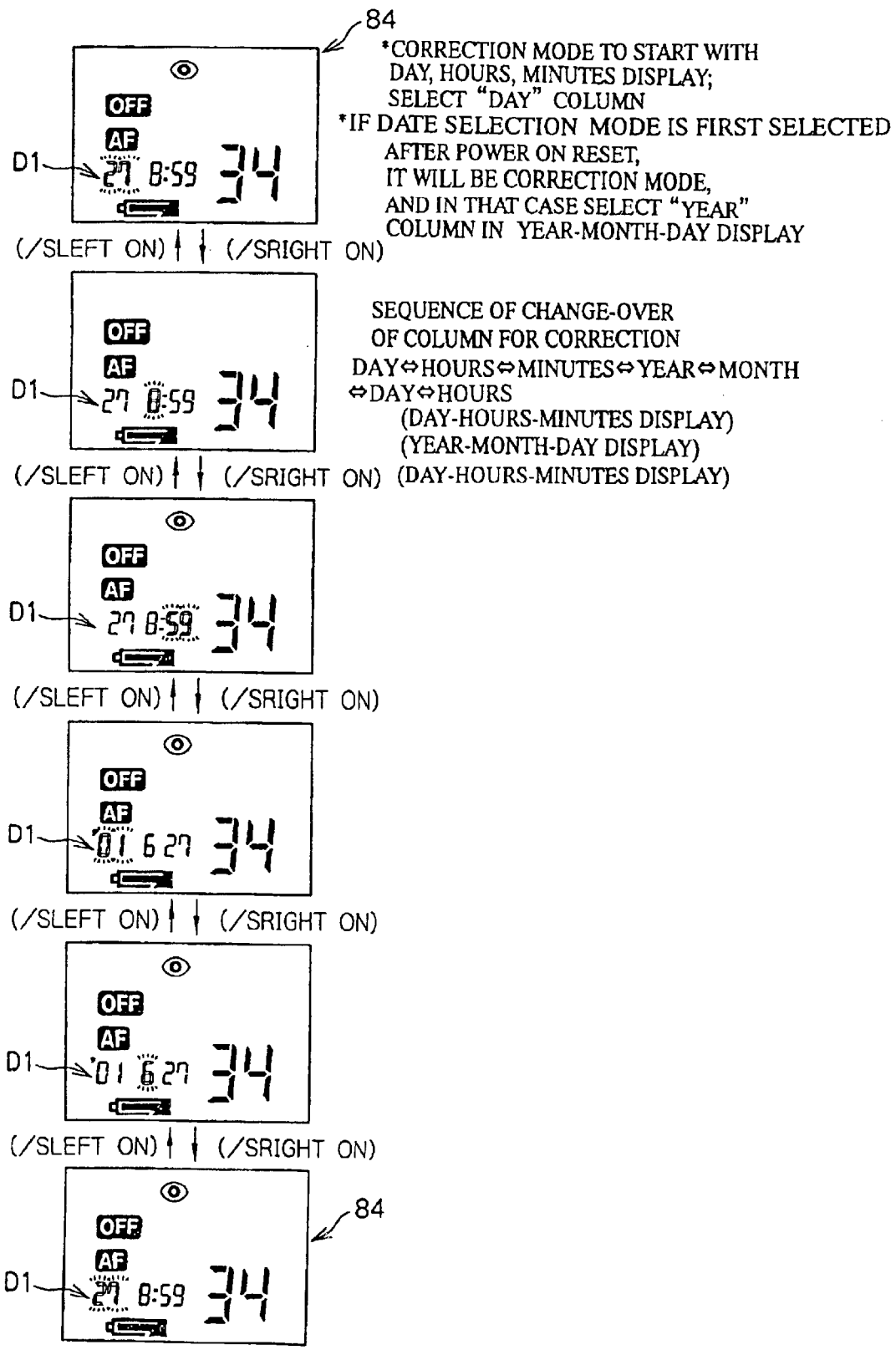
FIG. 25 shows how the display screen of the LCD panel looks in DATE correct column change-over processing when switch /SRIGHT and switch /SLEFT are turned on in the DATE correction mode.

Now will be described the DATE correct column change-over processing by the CPU 60 when the switch /SRIGHT is turned on in the DATE correction mode as described above with reference to the manner of displaying on the LCD panel 84 by way of example. It is supposed that the camera was set in the DATE correction mode before the switch /SRIGHT was turned on, and the correction of "day" was selected. In other words, the correctable column was set to be "day". Then, as shown in FIG. 25(A), the "day" display in the English letter-numeral segment D1 of the LCD panel 84 is lit intermittently as the correctable column. The day is set to 27 in this illustration.

When the switch /SRIGHT is turned on in this case, the correctable column is changed over to "hours" as shown in FIG. 25(B), and the "hours" display in the English letter-numeral segment D1 is lit intermittently as the correctable item. Where the correctable column is set to be "hours" as in FIG. 25(B), when the switch /SRIGHT is turned on, the correctable column is changed over to "minutes" as shown in FIG. 25(C), and the "minutes" display in the English letter-numeral segment D1 is intermittently as the correctable column.

Further, where the correctable column is set to be "minutes" as shown in FIG. 25(C), when the switch /SRIGHT is turned on, the display in the English letter-numeral segment D1 is changed over to "year", "month" and "day" as shown in FIG. 25(D) and, at the same time, the correctable column is changed over to "year", whose display is lit intermittently as the correctable item. Where the correctable column is set to be "year" as in FIG. 25(D), when the switch /SRIGHT is turned on, the correctable column is changed over to "month" as shown in FIG. 25(E), and the "month" display in the English letter-numeral segment D1 is lit intermittently as the correctable column. Where the correctable column is set to be "month" as in FIG. 25(E), when the switch /SRIGHT is turned on, the display in the English letter-numeral segment D1 is changed over to "day", "hours" and "minutes as shown in FIG. 25(E), the correctable column is changed over to "day", whose display is lit intermittently as the correctable column. Incidentally, the state of FIG. 25(E) is that of FIG. 25(A), in which every time the switch /SRIGHT is turned on, the above-described change-over processing of the correctable column is repeated. When the switch /SLEFT is turned on, the correctable column is changed over in exactly the reverse way to what takes place when the switch /SRIGHT is turned on.

Next will be described the case in which the determination is negative at step S400 of FIG. 24 above, i.e. the camera is not in the DATE correction mode. In this case, the CPU 60 determines whether or not the camera is in a selection mode (step S406). If the determination is affirmative then, i.e. it is in a selection mode, the CPU 60 turns on the LCDLED 2 in amber (step S408), and turns on the back light of the LCD panel 84 in amber.

Then, the CPU 60 determines whether or not the camera is in the FLASH selection mode (step S410). If the determination is affirmative then, the CPU 60 executes FLASH selection mode selection processing (step S412), and moves on to step S426 described above.

On the other hand, if the determination is negative at step S410, the CPU 60 then determines whether or not the camera is in the SELF selection mode (step S414). If the determination is affirmative here, the CPU 60 executes the SELF selection mode selection processing (step S416), and moves on to step S426. On the other hand, if the determination is negative at step S414, the CPU 60 then determines whether or not the camera is in the FOCUS selection mode (step S418). If the determination is affirmative here, the CPU 60 executes FOCUS selection mode selection processing (step S420), and moves on to step S426. On the other hand, if the determination is negative at step S420, since the camera is in the DATE selection mode, the CPU 60 executes DATE selection mode selection processing (step S422), and moves on to step S426. The contents of the aforementioned FLASH selection mode selection processing (step S412), SELF selection mode selection processing (step S416), FOCUS selection mode selection processing (step S420) and DATE selection mode selection processing (step S422) will be described in further detail afterwards.

If the determination at step S406 above is negative, i.e. the camera is not in a selection mode, the CPU 60, instead of executing any special processing, turns on the LCDLED 1 in green (step S424), moves on to step S426 and, when the switch /SRIGHT has been turned off, returns to the main routine of FIG. 9.

Figure 26:
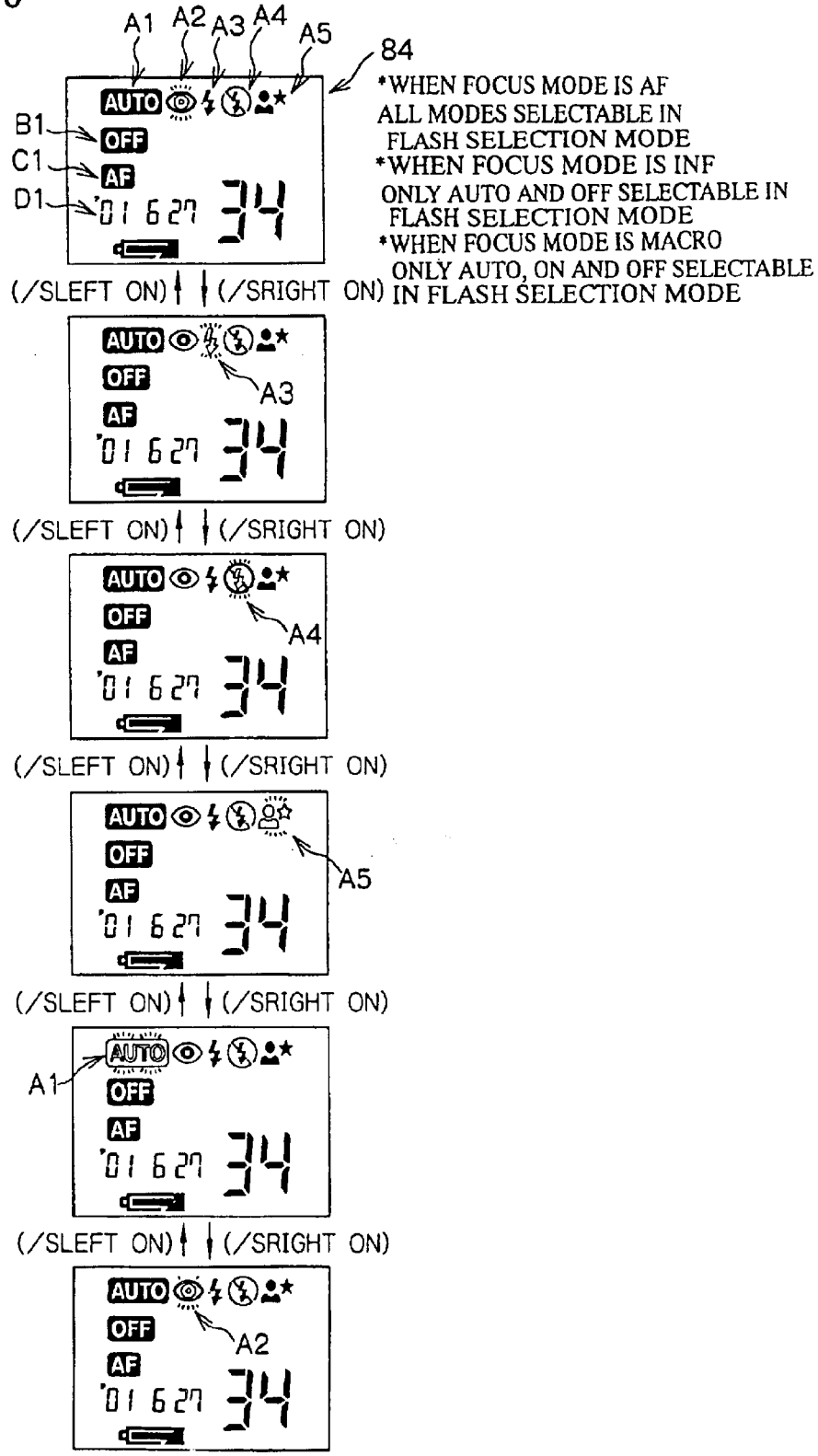
FIG. 26 shows how the display screen of the LCD panel looks in FLASH selection mode selection processing.

Now will be described the FLASH selection mode selection processing at step S412 above with reference to the manner of displaying on the LCD panel 84 by way of example. FLASH selection mode selection processing is intended for switching over the FLASH mode to be selected in the FLASH selection mode. It is supposed that the PRE mode is selected in the FLASH selection mode before the switch /SRIGHT is turned on. Then the LCD segments of the selectable FLASH modes are lit as shown in FIG. 26(A), or the LCD segment of the currently selected mode is lit intermittently. In FIG. 26(A), the PRE segment A2 is lit intermittently in a state in which the PRE mode is selected, and other LCD segments (AUTO segment A1, ON segment A3, F-OFF segment A4 and NVP segment A5) are lit continuously. Regarding the SELF modes, only the S-OFF segment B1 is lit in a state in which the S-OFF mode is selected; regarding the FOCUS modes, only the AF segment C1 is lit in a state in which the AF mode is selected; and regarding the DATE modes, the current "year", "month" and "day" are displayed in this sequence in the English letter-numeral segment D1 in a state in which the year-month-day print mode is selected.

When the switch /SRIGHT is turned on in this case, the selected FLASH mode shifts rightward by one to the ON mode. Then in the LCD panel 84, as shown in FIG. 26(B), the intermittently lit LCD segment is changed over from the PRE segment A2 to the ON segment A3. Further, when the switch /SRIGHT is turned on, the selected mode is changed over to the F-OFF mode and, as shown in FIG. 26(C), the F-OFF segment A4 is lit intermittently. Then, when the switch /SRIGHT is turned on again, the selected mode is changed over to the NVP mode and, as shown in FIG. 26(D), the NVP segment A5 is lit intermittently. When the switch /SRIGHT is turned on once again, the selected mode is changed over to the AUTO mode and, as shown in FIG. 26(E), the AUTO segment A1 is lit intermittently. When the switch /SRIGHT is turned on further again, the selected mode is changed over to the PRE mode and, as shown in FIG. 26(F), the PRE segment A2 is lit intermittently. FIG. 26(F) shows the same state as what is shown in FIG. 26(A). Every time the switch /SRIGHT is turned on, the selected mode is changed over cyclically in the sequence stated above. Incidentally, when the switch /SLEFT is turned on instead of the switch /SRIGHT, the selected mode is changed over in the reverse order to what has been stated so far.

Figure 27:
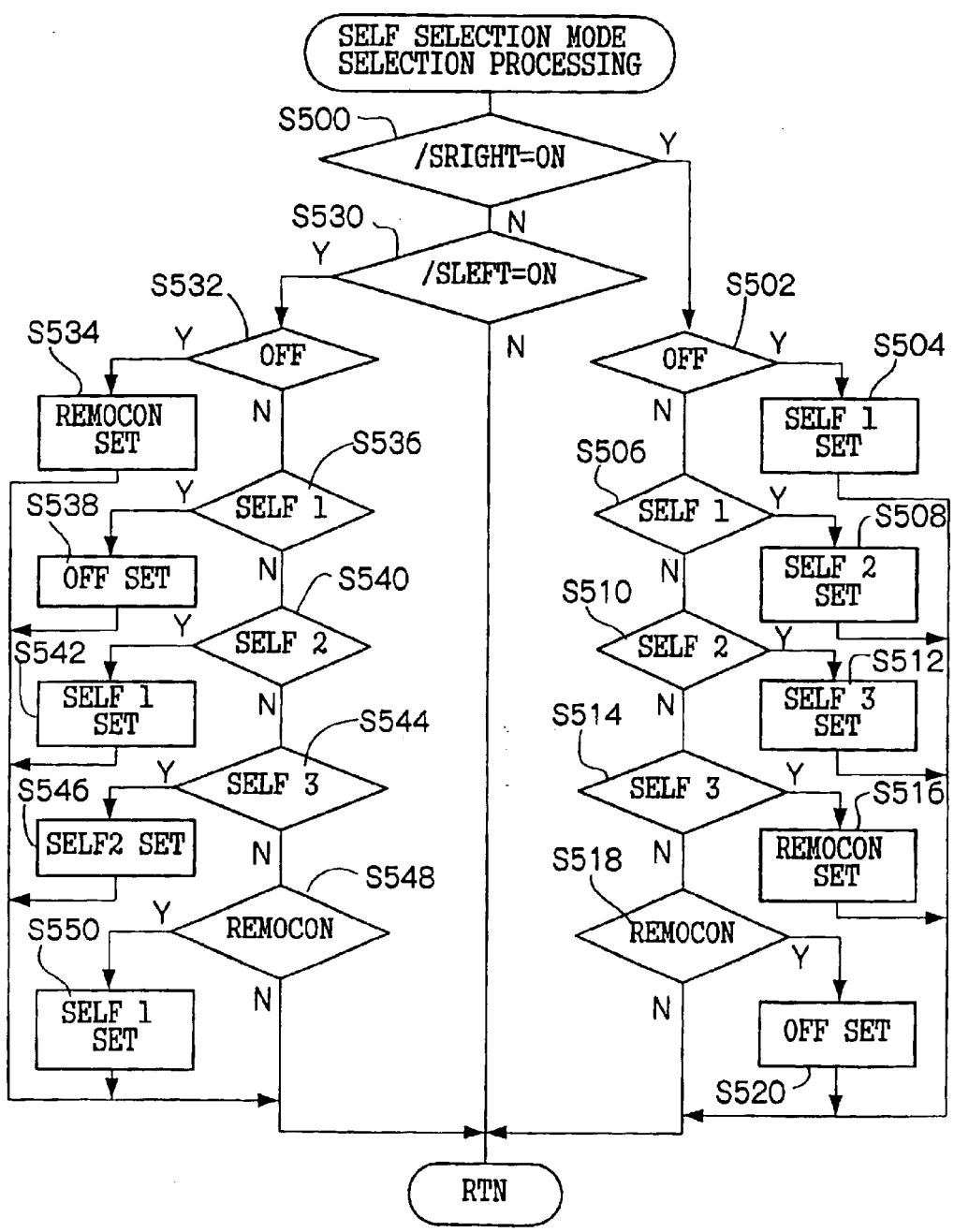
FIG. 27 is a flow chart showing the procedure of SELF selection mode selection.

Next will be described SELF selection mode selection processing at step S416 in FIG. 24 above according to the flow chart of FIG. 27 with reference to the manner of displaying on the LCD panel 84 by way of example. SELF selection mode selection processing is intended for changing over the selected SELF mode in the SELF selection mode, and in this processing the CPU 60, when the switch /SRIGHT is turned on (step S500), first determines whether or not the currently selected mode is the S-OFF mode (step S502). If then the determination is affirmative, the CPU 60 changes over the selected mode to the SELF 1 mode (step S504), and returns to the main routine of FIG. 9. The matching displays of the LCD panel 84 here are shown in FIG. 28(A) and FIG. 28(B). Regarding the SELF modes of FIG. 28(A), the S-OFF segment B1 of the currently selected S-OFF mode is lit intermittently, and the LCD segments of other modes (SELF segment B2 and REMOCON segment B3) are lit. Incidentally, the SELF 1 mode is displayed in the SELF segment B2. When in this case the switch /SRIGHT is turned on, the selection is changed over to the SELF 1 mode, and the SELF 1 mode is displayed in the SELF segment B2 as shown in FIG. 28(B) while the SELF segment B2 is lit intermittently.

If the determination at step S502 above is negative, the CPU 60 then determines whether or not the currently selected mode is the SELF 1 mode (step S506). If the determination then is affirmative, the CPU 60 changes over the selected mode to the SELF 2 mode (step S508), and returns to the main routine of FIG. 9. The matching displays on the LCD panel 84 here are shown in FIG. 28(B) and FIG. 28(C). FIG. 28(B) shows displaying of the SELF 1 mode in the SELF segment B2 in a state in which the SELF 1 mode is selected as stated above, together with intermittent lighting of the SELF segment B2. When the switch /SRIGHT is turned on in this case, the choice is changed over to the SELF 2 mode, and the SELF 2 mode is displayed in the SELF segment B2 as shown in FIG. 28(C), together with intermittent lighting of the SELF segment B2.

If the determination at step S506 above is negative, the CPU 60 then determines whether or not the currently selected mode is the SELF 2 mode (step S510). If the determination is affirmative, the CPU 60 changes over the selected mode to the SELF 3 mode (step S512), and returns to the main routine of FIG. 9. The matching displays on the LCD panel 84 here are shown in FIG. 28(C) and FIG. 28(D).

FIG. 28(C) shows a state in which the SELF 2 mode is selected as stated above, wherein the SELF 2 mode is displayed in the SELF segment B2, together with intermittent lighting of the SELF segment B2. If the switch /SRIGHT is turned on in this case, the choice is changed over to the SELF 3 mode, and the SELF 3 mode is displayed in the SELF segment B2 as shown in FIG. 28(D), together with intermittent lighting of the SELF segment B2.

If the determination at step S510 above is negative, the CPU 60 then determines whether or not the currently selected is the SELF 3 mode (step S514). If the determination is affirmative, the CPU 60 changes over the selected mode to the REMOCON mode (step S516), and returns to the main routine of FIG. 9. The matching displays on the LCD panel 84 here are shown in FIG. 28(D) and FIG. 28(E). FIG. 28(D) shows a state in which the SELF 3 mode as stated above, wherein the SELF 3 mode is displayed in the SELF segment B2, together with intermittent lighting of the SELF segment B2. If the switch /SRIGHT is turned on in this case, the choice is changed over to the REMOCON mode, the REMOCON segment B3 is intermittently lit as shown in FIG. 28(E).

If the determination at step S514 above is negative, the CPU 60 then determines whether or not the currently selected mode is the REMOCON mode (step S518). If the determination is affirmative, the CPU 60 changes over the selected mode to the S-OFF mode (step S520), and returns to the main routine of FIG. 9. The matching displays on the LCD panel 84 here are shown in FIG. 28(E) and FIG. 28(F). FIG. 28(E) shows a state in which the REMOCON mode is selected as stated above, wherein the REMOCON segment B3 is lit intermittently. When the switch /SRIGHT is turned on in this case, the choice is changed over to the S-OFF mode, and the S-OFF segment B1 is lit intermittently as shown in FIG. 28(F). This is a return to the state shown in FIG. 28(A).

On the other hand the CPU 60, when the switch /SLEFT is turned on (step S530), first determines whether or not the currently selected mode is the S-OFF mode (step S532). If the determination here is affirmative, the CPU 60 changes over the selected mode to the REMOCON mode (step S534), and returns to the main routine of FIG. 9. The matching displays on the LCD panel 84 here are shown in FIG. 28(F) and FIG. 28(E). FIG. 28(F) shows a state in which the S-OFF segment B1 is lit intermittently as stated above. When the switch /SLEFT is turned on in this case, the choice is changed over to the REMOCON mode, and the REMOCON segment B3 is lit intermittently as shown in FIG. 28(E).

If the determination at step S532 is negative, the CPU 60 then determines whether or not the currently selected mode is the SELF 1 mode (step S536). If the determination here is affirmative, the CPU 60 changes over the selected mode to the S-OFF mode (step S538), and returns to the main routine of FIG. 9. The matching displays on the LCD panel 84 here are shown in FIG. 28(B) and FIG. 28(A). FIG. 28(B) shows a state in which the SELF 1 mode is selected as stated above, wherein the SELF 1 mode is displayed in the SELF segment B2, and the SELF segment B2 is lit intermittently. If the switch /SLEFT is turned o in this case, the choice is changed over to the S-OFF mode, and the S-OFF segment B1 is lit intermittently as shown in FIG. 28(A).

If the determination at step S536 above is negative, then determines whether or not the currently selected mode is the SELF 2 mode (step S540). If the determination here is affirmative, the CPU 60 changes over the selected mode to the SELF 1 mode (step S542), and returns to the main routine of FIG. 9. The matching displays on the LCD panel 84 here are shown in FIG. 28(C) and FIG. 28(B). FIG. 28(C) shows a state in which the SELF 2 mode is selected above, wherein the SELF 2 mode is displayed in the SELF segment B2, and the SELF segment B2 is lit intermittently. When the switch /SLEFT is turned on in this case, the choice is changed over to the SELF 1 mode, the SELF 1 mode is displayed in the SELF segment B2 as shown in FIG. 28(B), and the SELF segment B2 is lit intermittently.

If the determination at step S540 above is negative, the CPU 60 then determines whether or not the currently selected mode is the SELF 3 mode (step S544). If the determination here is affirmative, the CPU 60 changes over the selected mode to the SELF 2 mode (step S546), and returns to the main routine of FIG. 9. The matching displays on the LCD panel 84 here are shown in FIG. 28(D) and FIG. 28(C). FIG. 28(D) shows a state in which the SELF 3 mode is selected as stated above, wherein the SELF 3 mode is displayed in the SELF segment B2, and the SELF segment B2 is lit intermittently. If the switch /SLEFT is turned on in this case, the choice is switched over to the SELF 2 mode, the SELF 2 mode is displayed in the SELF segment B2 as shown in FIG. 28(C), and the SELF segment B2 is lit intermittently.

If the determination at step S544 above is negative, the CPU 60 then determines whether or not the currently selected mode is the REMOCON mode (step S548). If the determination here is affirmative, the CPU 60 changes over the selected mode not to the SELF 3 mode but to the SELF 1 mode (step S550), and returns to the main routine of FIG. 9. The matching displays on the LCD panel 84 here are shown in FIG. 28(E) and FIG. 28(B). FIG. 28(E) shows a state in which the REMOCON mode is selected as stated above, wherein the REMOCON segment B3 is lit intermittently. When the switch /SLEFT is turned on this case, the choice is changed over to the SELF 1 mode, the SELF 1 mode is displayed in the SELF segment B2 as shown in FIG. 28(B), and the SELF segment B2 is lit intermittently.

Figure 29A:
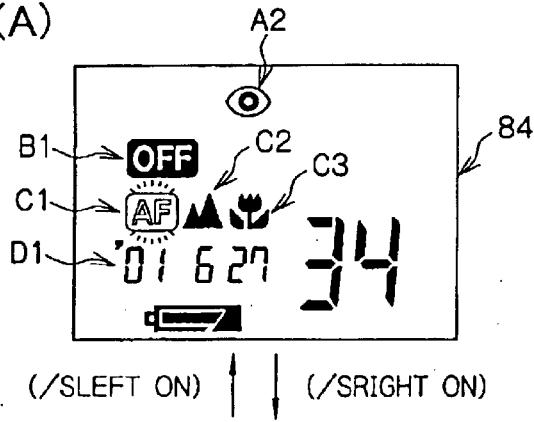
FIGS. 29(A), 29(B), 29(C) and 29(D) show how the display screen of the LCD panel looks in FOCUS selection mode selection processing.

Next, the FOCUS selection mode selection processing at step S420 above will be described with reference to the manner of displaying on the LCD panel 84 by way of example. FOCUS selection mode selection processing is intended for changing over the selected FOCUS mode in the FOCUS selection mode. It is supposed that AF mode is selected in the FOCUS selection mode before the switch /SRIGHT is turned on. Then the LCD segments of the selectable FOCUS modes are lit as shown in FIG. 29(A), or the LCD segment of the currently selected mode is lit intermittently. In FIG. 29(A), the AF segment C1 is lit intermittently in a state in which the AF mode is selected, and other LCD segments (INF segment C2 and MACRO segment A3) are lit continuously. Regarding the FLASH modes, only the PRE segment A2 is lit in a state in which the PRE mode is selected; regarding the SELF modes, only the S-OFF segment B1 is lit in a state in which the S-OFF mode is selected; and regarding the DATE modes, the current "year", "month" and "day" are displayed in this sequence in the English letter-numeral segment D1 in a state in which the year-month-day print mode is selected.

Figure 29B:
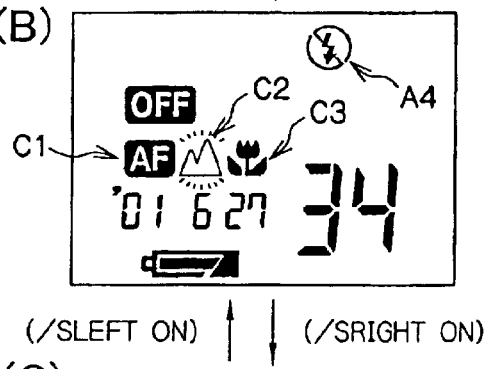

When the switch /SRIGHT is turned on in this case, the FOCUS mode, the selected mode is shifted rightward by one to the INF mode. Then in the LCD panel 84, as shown in FIG. 29(B), the intermittently lit LCD segment is changed over from the AF segment C1 to the INF segment C2. In the INF mode, as the selection of the PRE mode for the FLASH mode is forbidden but the selection of only the F-OFF mode is permitted, automatic changing over to the F-OFF mode takes place, and the F-OFF segment A3 is lit. Incidentally, when the FOCUS mode is automatically changed over in the FOCUS selection mode in this manner, the mode selected before the change-over is memorized until the mode selection is made definite.

Figure 29C:
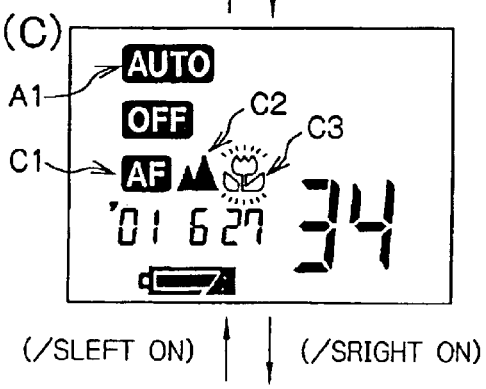

When the switch /SRIGHT is turned on again, the selected mode is changed over to the MACRO mode, and the MACRO segment C3 is lit intermittently as shown in FIG. 29(C). Incidentally in the MACRO mode, too, the choice of the PRE mode is forbidden for the FLASH mode, but the choice of the AUTO mode, the F-OFF mode or the ON mode is permitted. When there is any restriction due to combination with the FLASH mode, the FLASH mode is automatically changed to a suitable one. As illustrated it is changed to the AUTO mode, and the AUTO segment A1 is lit.

Figure 29D:
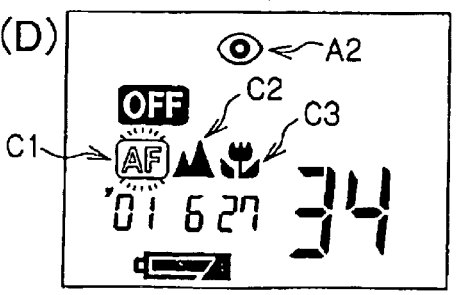

When the switch /SRIGHT is turned on once again, the selected mode is changed over to the AF mode, and the AF segment C1 is lit intermittently as shown in FIG. 29(D). Incidentally, FIG. 29(D) shows the same state as what is shown in FIG. 29(A), wherein every time the switch /SRIGHT is turned on, the selected mode is cyclically changed over in the sequence described above. When a change-over to the AF mode takes place, the PRE mode originally selected for the FLASH mode is permitted, resulting in a return to the PRE mode and the lighting of the PRE segment A2. If the switch /SLEFT is turned on instead of the switch /SRIGHT, the selected mode is changed over in a sequence reverse to the above-described.

Figure 30:
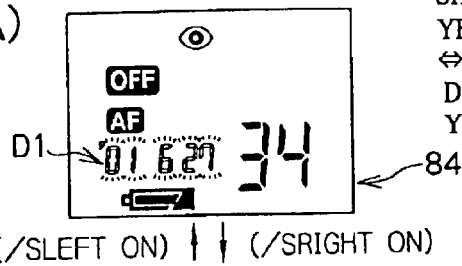
FIGS. 30(A), 30(B), 30(C), 30(D), 30(E) and 30(F) show how the display screen of the LCD panel looks in DATE selection mode selection processing.
Figure 30:
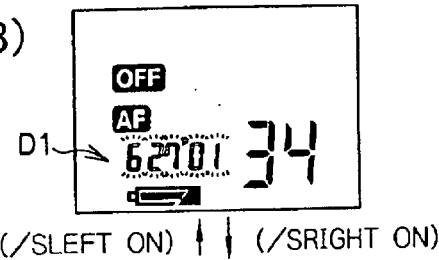
Figure 30:
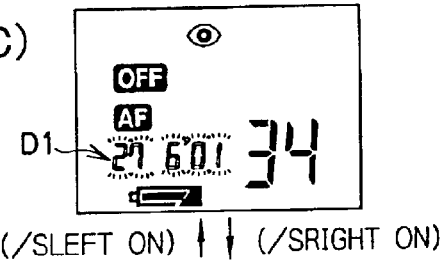
Figure 30:
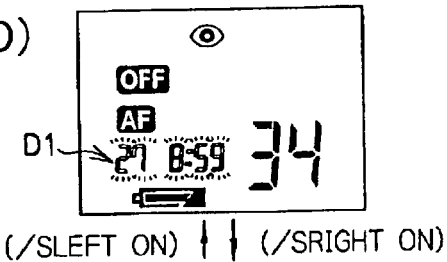
Figure 30:
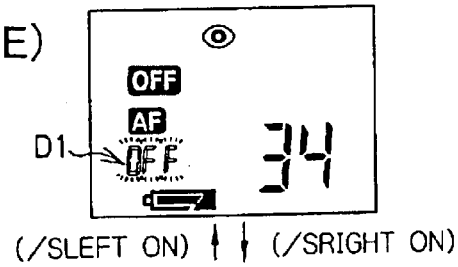
Figure 30:
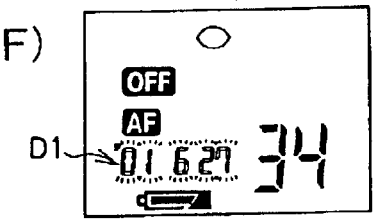

Next will be described DATE selection mode selection processing at step S422 above with reference to the manner of displaying on the LCD panel 84 by way of example. DATE selection mode selection processing is intended for changing over the selected DATE mode in the DATE selection mode. It is supposed that the year-month-day print mode is selected in the state of the DATE selection mode before the switch /SRIGHT is turned on. Here the current "year", "month" and "day" are intermittently displayed in this sequence in the English letter-numeral segment D1 as shown in FIG. 30(A). Incidentally, regarding the FLASH modes, only the PRE segment A2 is lit in a state in which the PRE mode is selected; regarding the SELF modes, only the S-OFF segment B1 is lit in a state in which the S-OFF mode is selected; and regarding the FOCUS modes, only the AF segment C1 is lit in a state in which the AF mode is selected.

When the switch /SRIGHT is turned on in this case, the selected DATE mode is changed over to the month-day-year print mode. Then on the LCD panel 84, as shown in FIG. 30(B), the current "month", "day" and "year" are intermittently displayed in this sequence in the English letter-numeral segment D1. When the switch /SRIGHT is turned on again, the selected mode is changed over to the day-month-year print mode and, as shown in FIG. 30(C), the current "day", "month" and "year" are intermittently displayed in this sequence in the English letter-numeral segment D1. When the switch /SRIGHT is turned on once again, the selected mode is changed over to the day-hours-minutes print mode and, as shown in FIG. 30(D), the current "day", "hours" and "minutes" are intermittently displayed in this sequence in the English letter-numeral segment D1. When the switch /SRIGHT is turned on further again, the selected mode is changed over to the D-OFF mode and, as shown in FIG. 30(E), the current "OFF" letters are displayed in the English letter-numeral segment D1. When the switch /SRIGHT is turned on yet again, the selected mode is changed over to the year-month-day print mode and, as shown in FIG. 30(F), the current "year", "month" and "day" are intermittently displayed in this sequence in the English letter-numeral segment D1. Incidentally, FIG. 30(F) shows the same state as FIG. 30(A) does. Thus, every time the switch /SRIGHT is turned on, the selected mode is cyclically changed over in the sequence stated above. If, instead of the switch /SRIGHT, the switch /SLEFT is turned on, the selected mode is changed over in the sequence reverse to the above-described. As hitherto described, the camera embodying the invention in this manner has an LCD panel 84 for displaying the shooting mode and the like that can be lit in different colors by using either the LCDLED 1 in green or the LCDLED 2 in amber. In the above-described processing, in a state of a selection mode permitting mode selection, the LCDLED 2 in amber is turned on, the LCDLED 1 in green is turned off, and the LCD panel 84 is illuminated with amber back light.

On the other hand, in a state of definite mode (the regular mode), the LCDLED 1 in green is turned on, the LCDLED 2 in amber is turned off, and the LCD panel 84 is illuminated with green back light. By changing the color of light illuminating the LCD panel 84 according to the state of the camera, the user can readily know what state the camera is in.

Although the above-described embodiment of the invention is supposed to change the back light color of the LCD panel 84 between two colors, green and amber, other colors can as well be used for the back light, and the number of colors need not be limited to two, but the back light can be changed among three or more colors so that the state of the camera can be displayed on the LCD panel 84 in more detail differentiated by the back light color. It is also possible to display different states of the camera by not only turning on or off the back light but also by turning it on intermittently.

Although the foregoing embodiment changes the back light color of the LCD panel 84 according to whether or not the camera is in a selection mode, but the change-over can be based on some other condition. For instance, where two different shooting modes are available, including the automatic mode in which the camera automatically determines the shooting conditions and the manual mode in which the user set the shooting conditions as he or she likes, the back light color of the LCD panel 84 can be changed according to the selected mode, automatic or manual.

Alternatively, the CPU 60 can be caused to detect the state of the camera, normal or abnormal, and change the back light color of the LCD panel 84 accordingly. Especially when the camera is in an abnormal state, the back light may be intermittently lit. Distinction between normal and abnormal states can be judged according to whether or not the camera has worked normally.

The illumination of the LCD panel 84 need not be provided from behind the LCD panel 84 as in the foregoing embodiment, but the panel can as well be illuminated from the fore.

Regarding the grouping of modes, while the embodiment described above had a classification into the FLASH modes related to the flash lamp (exposure), the SELF modes related to the start of shutter releasing, the FOCUS modes related to focusing, and the DATE modes related to date printing, the invention can be applied if the modes are classified into at least two or more groups.

While the currently selected mode is intermittently displayed on the LCD panel 84 for a group from which a mode can be selected and modes not selected are lit continuously, the differentiation in lighting can as well be reversed.

As hitherto described, the camera according to the present invention can display selectable modes on the LCD panel group by group in a way perceivable at a glance, and the choice of a group and that of a mode within each group are matched in the mode display arrangement to facilitate the operation for mode selection.

As the modes selected from different groups are displayed on the LCD panel at the same time, the combination of modes used in shooting can be clearly displayed, and any constraint on mode selection and/or automatic change in the mode selected from another group can also be displayed.

Furthermore, in selecting a multiple self-photographing mode, a remote control mode or an OFF mode, the changeover is possible either in the forward or the backward direction, and the selectable modes are differentiated between the forward and the backward directions to make possible more convenient changing over.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera, comprising:
    a display device which displays a plurality of modes of the camera, the display device classifying the plurality of modes into groups according to their type and simultaneously displaying the mode selected in each group;
    an operating member which selects a desired one out of the groups and selects a desired one out of the modes belonging to the selected group; and
    a limiting device which, in the selection of a mode belonging to a certain group by the operating member, limits selectable modes according to modes selected out of other groups and, if the operating member selects a mode belonging to a certain group, automatically changes, according to that selected mode, modes selected out of other groups.

2. The camera as set forth in claim 1, wherein the display device displays all selectable modes belonging to the group selected by the operating member and, for the modes belonging to other groups not selected by the operating member displays only a selected or automatically changed mode in each group.

3. The camera as set forth in claim 1, wherein the limiting device, when the operating member selects a mode belonging to a certain group, automatically changes, according to the selected mode, modes selected out of other groups and, if the operating member subsequently further selects the mode belonging to the certain group, returns automatically changed modes in other groups to their initially selected modes.

4. The camera as set forth in claim 1, wherein:
    the groups comprise a first group of modes related to a flash lamp and a second group of modes related to focusing; and
    the limiting device, in selecting a mode belonging to the first group, limits the selectable modes according to the mode selected out of the second group and, when the operating member selects a mode belonging to the second group, automatically changes, according to that selected mode, the mode selected out of the first group.

5. The camera as set forth in claim 4, wherein the first group has at least two or more modes out of a low luminance automatic lighting mode, a red eye preventing mode, an all-time flash lamp lighting mode, a flash lamp forbidding mode, and a night view portrait mode, the second group has at least two or more modes out of an auto-focusing mode, a fixed infinite-distance focusing mode, and a macro-focusing mode.

6. A camera capable of changing over among multiple self-photographing modes in which the number of self-shot pictures is selectable, a remote control mode, and an OFF mode for canceling the multiple self-photographing modes and the remote control mode, the camera comprising:
    an operating member which changes over the OFF mode, the multiple self-photographing modes and the remote control mode in a forward or backward direction; and
    a mode changing device which changes the selectable self-photographing modes according to the direction in which the operating member is manipulated, forward or backward, wherein:
        the multiple self-photographing modes comprises 1 to n self modes where n is the selectable number of self-taken pictures,
        if the operating member is manipulated within the range of the 1 to n self modes in either the forward or backward direction, the mode changing device selects the 1 to n self modes sequentially in either the forward or backward direction, and
        if the operating member is manipulated in any other mode than the 1 to n self modes in the backward direction, the mode changing device selects only the self 1 mode.

7. The camera as set forth in claim 6, further comprising:
    a display device which automatically displays the OFF mode, one self mode out of the 1 to n self modes and the remote control mode,
    wherein when the operating member is manipulated in the forward direction for a change-over to any other mode than the 1 to n self modes, the display device returns the display from the self n mode to the self 1 mode.

8. The camera as set forth in claim 7, wherein the display device distinguishably displays a mode selected by the operating member and another mode not selected thereby, out of the OFF mode, one self mode out of the 1 to n self modes and the remote control mode.

* * * * *